(12) United States Patent
Abe et al.

(10) Patent No.: US 10,983,336 B2
(45) Date of Patent: Apr. 20, 2021

(54) DOME COVER, IMAGE PICKUP APPARATUS, AND IMAGE PICKUP SYSTEM

(71) Applicant: CANON KABUSHIKI KAISHA, Tokyo (JP)

(72) Inventors: Hirofumi Abe, Utsunomiya (JP); Kenta Sudo, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/791,078

(22) Filed: Feb. 14, 2020

(65) Prior Publication Data

US 2020/0271924 A1   Aug. 27, 2020

(30) Foreign Application Priority Data

Feb. 21, 2019   (JP) .............................. JP2019-029527
Feb. 21, 2019   (JP) .............................. JP2019-029528

(51) Int. Cl.
*G02B 27/00*    (2006.01)
*H04N 5/225*    (2006.01)
*H04N 5/232*    (2006.01)

(52) U.S. Cl.
CPC ....... *G02B 27/0025* (2013.01); *H04N 5/2254* (2013.01); *H04N 5/23203* (2013.01); *H04N 5/23299* (2018.08)

(58) Field of Classification Search
CPC ............. G02B 27/0025; H04N 5/2254; H04N 5/23299; H04N 5/23203; H04N 5/2252; H04N 5/2251
See application file for complete search history.

(56) References Cited

U.S. PATENT DOCUMENTS

| 7,813,789 B2 * | 10/2010 | Glukhovsky | A61B 1/05 600/476 |
| 8,092,101 B2 * | 1/2012 | Basho | G03B 27/58 396/427 |
| 8,891,005 B2 * | 11/2014 | Sasaki | G03B 17/56 348/373 |
| 9,116,330 B2 | 8/2015 | Abe | |
| 9,250,426 B2 | 2/2016 | Abe | |

(Continued)

FOREIGN PATENT DOCUMENTS

| JP | 2012103452 A | 5/2012 |
| JP | 2012205307 A | 10/2012 |
| JP | 2015180044 A | 10/2015 |

*Primary Examiner* — Shahbaz Nazrul

(74) *Attorney, Agent, or Firm* — Carter, DeLuca & Farrell LLP

(57) ABSTRACT

A dome cover for covering a camera, the dome cover includes a spherical part and an aspherical part. The spherical part and the aspherical part have a boundary, where the spherical part and the aspherical part are adjacent to each other, on each of a front surface and a back surface of the dome cover. The aspherical part has a shape symmetrical with respect to a rotation around a rotation axis including a center of a sphere of the spherical part. On a section including the rotation axis, a distance from the rotation axis to the aspherical part increases as a position of the aspherical part becomes more distant from the boundary, an angle formed between the rotation axis and a line segment connecting the center of the sphere and the boundary on the front surface is less than 90°. A predetermined condition is satisfied.

20 Claims, 17 Drawing Sheets

(56) References Cited

U.S. PATENT DOCUMENTS

| | | |
|---|---|---|
| 9,651,762 B2 | 5/2017 | Abe |
| 9,715,090 B2 | 7/2017 | Abe |
| 9,733,451 B2 * | 8/2017 | Imaoka ............... G02B 15/1461 |
| 9,952,446 B2 | 4/2018 | Abe |
| 10,061,114 B2 | 8/2018 | Sudo |
| 10,104,274 B2 * | 10/2018 | He ....................... H04N 5/2254 |
| 10,197,778 B2 | 2/2019 | Sudo et al. |
| 10,545,335 B2 | 1/2020 | Sudo |
| 2012/0169870 A1 * | 7/2012 | Jain .................... G02B 27/0025 |
| | | 348/143 |
| 2014/0248045 A1 * | 9/2014 | Wada .................. H04N 5/2254 |
| | | 396/427 |
| 2018/0017851 A1 * | 1/2018 | Watanabe ............ H04N 5/2252 |
| 2018/0020135 A1 * | 1/2018 | Aoi ........................ G03B 17/14 |
| 2018/0024416 A1 * | 1/2018 | Kishine ................. H04N 5/225 |
| | | 359/614 |
| 2019/0212525 A1 | 7/2019 | Abe et al. |
| 2019/0227263 A1 | 7/2019 | Abe |

* cited by examiner

<COMPARATIVE EXAMPLE 1>    <EXAMPLE 1>

<COMPARATIVE EXAMPLE 2>   <EXAMPLE 4>

DOME COVER, IMAGE PICKUP APPARATUS, AND IMAGE PICKUP SYSTEM

BACKGROUND OF THE INVENTION

Field of the Invention

The present invention relates to a dome cover, an image pickup apparatus, and an image pickup system.

Description of the Related Art

Japanese Patent Application Laid-Open No. ("JP") 2012-205307 discloses a surveillance camera apparatus that suppresses a decrease in image quality by forming a dome cover only with a spherical shape obtained by connecting parts of a spherical shape divided into two or more. JP 2012-103452 discloses a dome type camera that suppresses a decrease in image quality using a polarizing filter or a partial light shielding filter. JP 2015-180044 discloses a dome camera that suppresses a decrease in image quality by providing a correction optical system between a dome cover and a camera body. U.S. Pat. No. 10,104,274 discloses a dome camera that suppresses a decrease in image quality by making the refractive powers of an end shape extended from spherical part in a sagittal direction and a meridian direction equal to the refractive power of the spherical part.

However, the configuration using two or more spherical dome covers as disclosed in JP 2012-205307 requires at least two molds for forming the dome covers, and the step of joining the dome covers together. The configuration disclosed in JP 2012-103452 or 2015-180044 requires the optical element for suppressing the decrease in image quality and a mechanism for driving the optical element separately from the camera body.

The dome camera disclosed in U.S. Pat. No. 10,104,274 insufficiently corrects the astigmatism generated when the camera body tilts on the extended shape side further than the horizontal direction, or cannot sufficiently obtain the effect of suppressing the decrease in image quality.

SUMMARY OF THE INVENTION

An aspect of embodiments provides, for example, a dome cover beneficial in an image quality thereby and a simple structure thereof.

A dome cover according to one aspect of the present invention for covering a camera, the dome cover includes a spherical part and an aspherical part. The spherical part and the aspherical part have a boundary, where the spherical part and the aspherical part are adjacent to each other, on each of a front surface and a back surface of the dome cover. The aspherical part has a shape symmetrical with respect to a rotation around a rotation axis including a center of a sphere of the spherical part. On a section including the rotation axis, a distance from the rotation axis to the aspherical part increases as a position of the aspherical part becomes more distant from the boundary, an angle formed between the rotation axis and a line segment connecting the center of the sphere and the boundary on the front surface is less than 90°. A conditional expression $$1.12 < |fm/fd| < 1.80$$

is satisfied where fd is a focal length of the spherical part, and fm is a focal length of the aspherical part.

An image pickup apparatus or an image pickup system having the dome cover also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Examples 1 to 3

Figure 1:
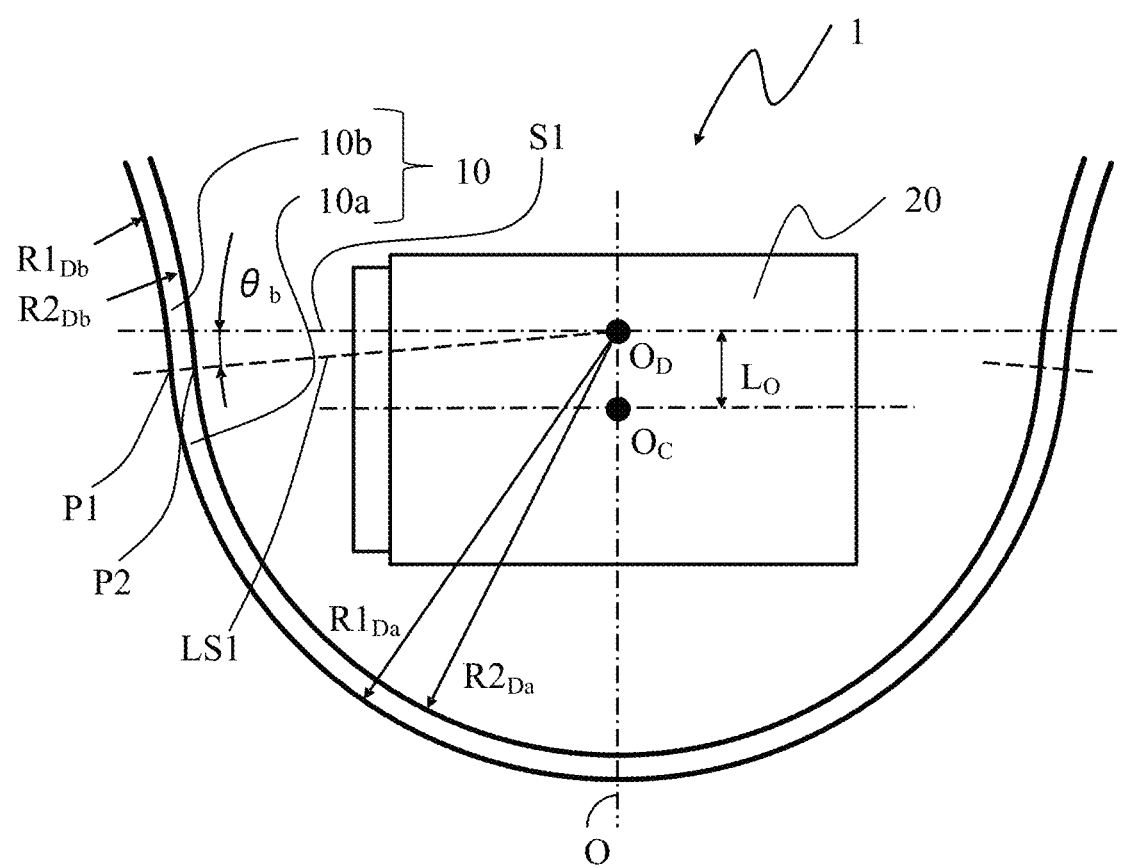
FIG. 1 is a sectional view of an image pickup apparatus according to Example 1.

Referring now to FIG. 1, a description will be given of image pickup apparatuses according to Examples 1 to 3. FIG. 1 is a sectional view of the image pickup apparatus 1 according to Example 1.

The image pickup apparatus 1 includes a camera body 20 (also simply referred to as a camera) including an optical system (image pickup optical system, lens apparatus), an image sensor (light receiving element, image pickup element), and a housing (holding member) configured to hold the optical system and the image sensor, and a dome cover 10 that covers the camera body 20. In this embodiment, the optical system may be attachable to and detachable from the camera (image pickup element) as a lens apparatus.

The dome cover 10 has a spherical part 10a and an aspherical part 10b. The spherical part 10a and the aspherical part 10b are adjacent to each other at boundary points (arbitrary boundary points) P1 and P2 on the front surface (outer surface) and the back surface (inner surface) of the dome cover 10, respectively. Herein, the boundary points P1 and P2 are points at which the curvature direction and radius of curvature change or the points at which the curvature changes. The aspherical part 10b has a rotationally symmetrical shape with respect to a rotation axis O including the center of the sphere OD of the surface of the spherical part 10a. The distance from the rotation axis O to the aspherical part 10b increases as the distances from the boundary points P1 and P2 increase. An angle between a line segment LS1 made by connecting the center of the sphere OD and the boundary point P1 on the surface of the dome cover 10 and the rotation axis O is less than 90°. Due to this configuration, the dome cover 10 has a shape with no undercut portion and thus the dome cover 10 can be configured by a single component because it can be integrally formed by molding with a thermoplastic resin and a mold.

On the section including the rotation axis O, the front and back surfaces of the aspherical part 10b form arcs (so-called toric surface shapes). The front and back surfaces of the dome cover 10 each formed in a toric surface shape enable the focal length of the aspherical part 10b on a section orthogonal to the rotation axis O and the focal length of the aspherical part 10b on a section orthogonal to the section orthogonal to the rotation axis O to be independently set. Hence, the astigmatism can be properly corrected, which would be otherwise caused by the lens effect of the cylindrical or conical extended shape.

The following conditional expression (1) is satisfied:

$$1.12 < |fm/fd| < 1.80 \quad (1)$$

where fd is a focal length of the spherical part 10a and fm is a focal length of the aspherical part 10b on the section including the rotation axis O.

The conditional expression (1) defines a ratio of the focal length fm to the focal length fd of the spherical part 10a on the section including the rotation axis O of the aspherical part 10b. This is the condition so as to properly correct the astigmatism when the camera body 20 is tilted so that most of the light flux of the camera body 20 disposed inside the dome cover 10 is located within the region of the aspherical part 10b. When the value is higher than the upper limit of the conditional expression (1), the focal length fm of the aspherical part 10b on the section including the rotation axis O becomes excessively long or the refractive power becomes excessively weak, and the astigmatism is insufficiently corrected. On the other hand, when the value is lower than the lower limit of the conditional expression (1), the focal length fm of the aspherical part 10b on the section including the rotation axis O becomes excessively short, and the astigmatism is excessively corrected.

When the value of the conditional expression (1) is around 1.0, the astigmatism is corrected when the camera body 20 is oriented in the horizontal direction. On the other hand, in a surveillance camera, in many cases, the driving center of the pan or tilt drive of the camera body 20 is offset to the dome surface side of the spherical part 10a from the center of the spherical part 10a in order to reduce the size of the entire apparatus and the influence of the aspherical part 10b. Thus, when the camera body 20 is oriented in the horizontal direction, most of the effective light flux of the camera body 20 particularly in the telephoto range passes through the spherical part 10a. The imaging state of the light flux that has passed through the spherical part 10a has more influential on the resolution performance obtained when the camera body 20 is oriented in the horizontal direction than the imaging state of the light flux that has passed through the aspherical part 10b.

At a tilt angle such that the optical axis of the camera body 20 passes near the boundary between the spherical part 10a and the aspherical part 10b, the effective light flux passes both the spherical part 10a and the aspherical part 10b one half each. As a result, an imaging state is made in which two types of light fluxes overlap each other across optically discontinuous areas. In such a situation, even if only the astigmatism of the aspherical part 10b is properly corrected, the influence of the spherical part 10a remains. That is, when the camera body 20 is oriented in the horizontal direction, or at a tilt angle such that the optical axis of the camera body 20 passes near the boundary between the spherical part 10a and the aspherical part 10b, the effect of suppressing the decrease in image quality is small by correcting the astigmatism with the aspherical part 10b. In order to correct the astigmatism caused by the influence of the aspherical part 10b, the astigmatism may be corrected when the camera body 20 is tilted to such an extent that most of the effective light flux of the camera body 20 passes through the aspherical part 10b further than when the camera body 20 is oriented in the horizontal direction.

When the camera body 20 is tilted to such an extent that most of the effective light flux of the camera body 20 passes through the aspherical part 10b, the aspherical part 10b is obliquely inclined relative to the optical axis of the camera body 20. Hence, the optical path length of the dome cover 10 becomes longer than that when the camera body 20 is oriented in the horizontal direction. Since the refractive power of the aspherical part 10b on the section including the rotation axis O may be set to a proper refractive power for an increase in the optical path length due to the tilt, it is not the same as the refractive power of the spherical part 10a and the astigmatism can be properly corrected by satisfying the conditional expression (1). When the astigmatism is insufficiently or excessively corrected, a difference becomes larger between the in-focus position on the section including the rotation axis O and the in-focus position on the plane orthogonal to that section, and thereby the image quality lowers.

The following conditional expression (1a) may be satisfied.

$$1.15 < |fm/fd| < 1.50 \quad (1a)$$

The following conditional expression (1b) may be satisfied.

$$1.20 < |fm/fd| < 1.30 \quad (1b)$$

The above configuration can provide a dome cover that can maintain both the image quality and the light amount in the tilt region of the extended shape portion from the spherical part with a small number of components and a simple configuration, and an image pickup apparatus having the same.

The tangential plane of the spherical part 10a and the tangential plane of the aspherical part 10b at the boundary points P1 and P2 are the same planes. That is, the spherical part 10a and the aspherical part 10b have the same plane at each of the arbitrary boundary points P1 and P2. Thereby, the spherical part 10a and the aspherical part 10b are smoothly connected to each other, the flares or ghosts that would otherwise occur with discontinuous connection portions at the boundary points P1 and P2 are suppressed, and the image quality reduction can be effectively suppressed.

The respective center of the spheres OD (center points) of the front surface and the back surface of the spherical part 10a may be disposed on the rotation axis O. Thereby, in the spherical part 10a of the dome cover 10, a distance between the front surface and the back surface or a thickness of the dome cover 10 becomes constant in the direction orthogonal to the rotation axis O. Therefore, when the camera body 20 rotates in the direction orthogonal to the rotation axis O, the focal length of the dome cover 10 can be maintained constant. As a result, when the camera body 20 rotates, fluctuations in focus position and image quality can be effectively suppressed.

The respective rotation axes O of the front surface and the back surface of the aspherical part 10b may be common (disposed on the same straight line). Thereby, in the aspherical part 10b of the dome cover 10, a distance between the front surface and the back surface or a thickness of the dome cover 10 becomes constant in the direction orthogonal to the rotation axis O. Therefore, when the camera body 20 rotates in a direction orthogonal to the rotation axis O, the focal length of the dome cover 10 can be maintained constant. As a result, when the camera body 20 rotates, fluctuations in focus position and image quality can be effectively suppressed.

The material of the dome cover 10 may be a thermoplastic resin such as polycarbonate. Thereby, the mold for forming the shape of the dome cover 10 is manufactured, and the dome cover 10 can be manufactured by an injection molding process for melting, injecting, and solidifying the thermoplastic resin. Since the dome cover 10 can be manufactured by injection molding, the dome cover 10 can be manufactured as an integrated component by continuous molding under the same conditions under the environment in which the quality is less likely to scatter.

Each example can provide the thus configured dome cover 10 that maintains both the image quality and the light amount in a tilt region near the horizontal direction, with a simple configuration and a small number of components.

The image pickup apparatus 1 includes an image sensor 22 that photoelectrically converts an optical image (object image) formed by the image pickup optical system (zoom lens) 21 and outputs image data. The image sensor 22 includes a CCD (Charge Coupled Device) sensor or a CMOS (Complementary Metal Oxide Semiconductor) sensor for digitally processing the image.

Figure 4:
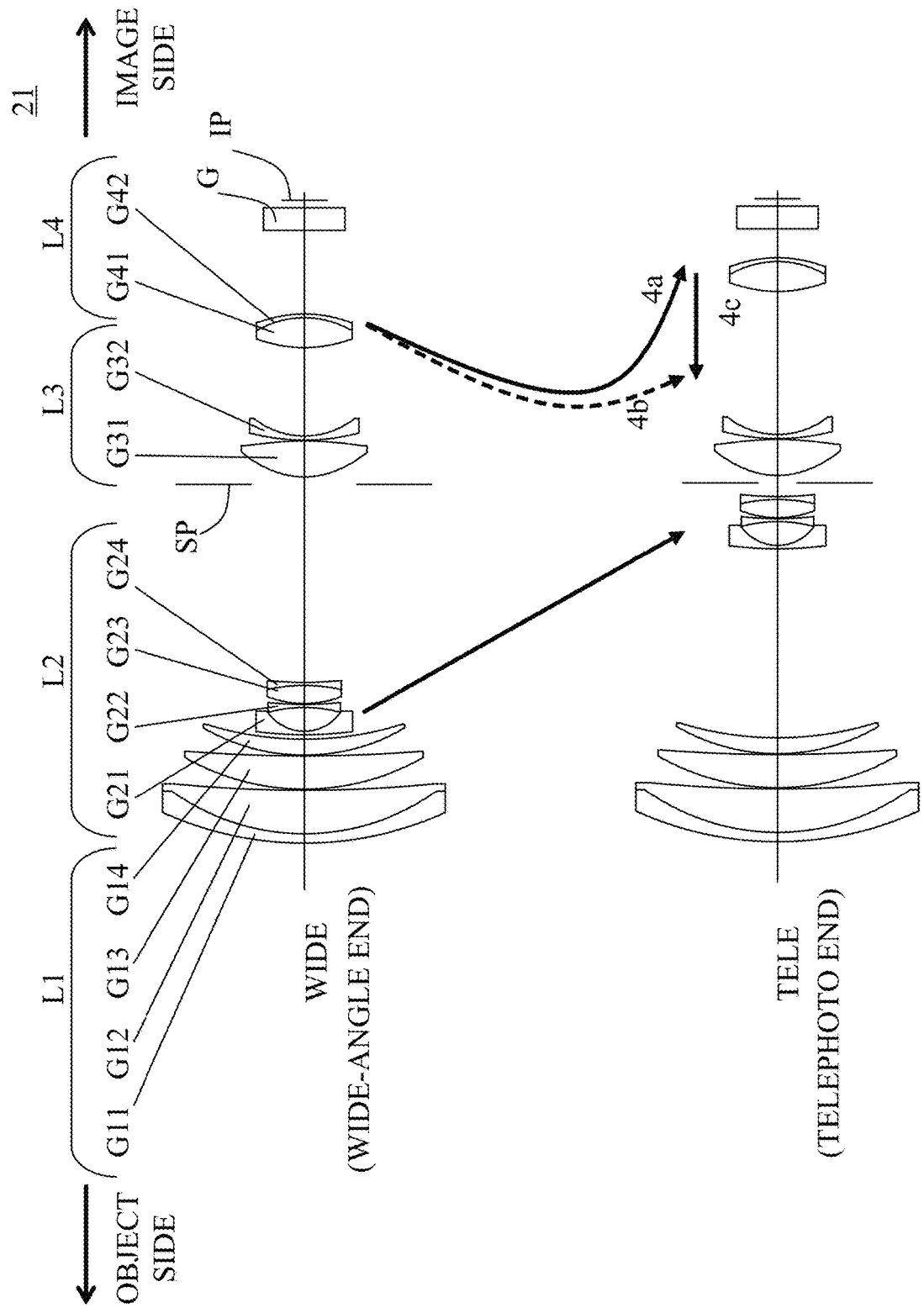
FIG. 4 is a sectional view of a zoom lens according to Examples 1 to 3.

Referring now to FIG. 4, a description will be given of a configuration of the image pickup optical system (zoom lens) 21 according to this embodiment. FIG. 4 is a sectional view of the zoom lens 21. The zoom lens 21 includes, in order from an object side to an image side, a first lens unit L1, a second lens unit L2, an aperture stop SP, a third lens unit L3, and a fourth lens unit L4. G is a glass block. IP is an image plane (imaging plane), and corresponds to an imaging plane of the image sensor 22. The zoom lens 21 is used for, but not limited to, an image pickup apparatus such as a surveillance camera, digital camera, and video camera.

In FIG. 4, the left side is the object side, and the right side is the image side. The wide-angle end and the telephoto end refer to zoom positions when the magnification varying lens unit is located at both ends in a mechanically movable range on the optical axis. Each lens unit moves from the wide-angle end to the telephoto end along a trajectory as indicated by an arrow (solid line) illustrated in FIG. 4. The solid curve and dotted curve of the fourth lens unit L4 are moving trajectories for correcting the image plane fluctuation at zoom positions from the wide-angle end to the telephoto end in focusing on an object at infinity and an object at a short distance, respectively. In focusing from the object at infinity to the object at the short distance at the zoom position of the telephoto end, the fourth lens unit L4 is moved as indicated by an arrow 4c in FIG. 4.

The aperture stop SP is disposed on the object side of the third lens unit L3, and fixed with the third lens unit L3 during the magnification variation. When the third lens unit L3 includes a plurality of lenses, the stop SP may be disposed in the third lens unit L3. The aperture stop SP may be independently moved so as to cut an off-axis marginal ray at each zoom position during the magnification variations, to cut the coma flare, and thereby to obtain better optical performance.

The first lens unit L1 includes a cemented lens formed by joining a negative lens G11 that has a meniscus shape and a concave surface on the image side and a positive lens G12 that has a convex surface on the object side, a positive lens G13 that has a convex surface on the object side, and a positive lens G14 that has a meniscus shape and a convex surface on the object side. Using the three positive lenses G12, G13, and G14, this embodiment can obtain the refractive power required for the first lens unit L1 without excessively increasing the refractive power of the lens surface of each lens. This embodiment can effectively reduce the spherical aberration, the coma aberration, the axial chromatic aberration, and the like at the telephoto end, which are likely to be problems particularly in a high magnification variation.

The second lens unit L2 includes a negative lens G21 that has a meniscus shape and a concave surface on the image side, a negative lens G22 having concave surfaces on both sides, and a cemented lens formed by joining a positive lens G23 having convex surfaces on both sides and a negative lens G24 having concave surfaces on both sides. This lens configuration can effectively correct the field curvature at the wide-angle end, the lateral chromatic aberration over the entire zoom range, and the spherical aberration at the telephoto end.

The third lens unit L3 includes a positive lens G31 that has convex surfaces on both sides and an aspherical shape on both sides, and a negative lens G32 that has a convex surface on the object side, a concave surface on the image side, and a meniscus shape. This lens configuration can effectively correct the spherical aberration at the wide-angle end.

The fourth lens unit L4 includes a cemented lens formed by joining a positive lens G41 that has convex surfaces on both sides and an aspheric surface on the object side, and a negative lens G42 that has a concave surface on the object side, a convex surface on the image side, and a meniscus shape. This lens configuration can reduce the fluctuations in field curvature and astigmatism generated during focusing.

Figure 23C:
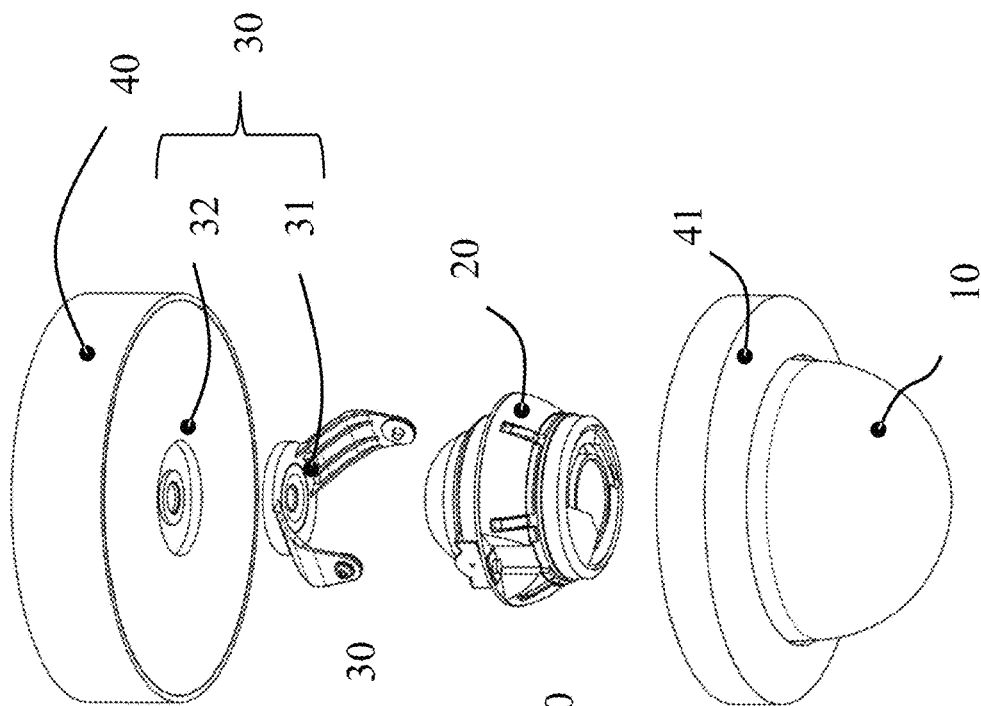
FIGS. 23A to 23C are configuration diagrams of an image pickup apparatus according to each example.
Figure 23B:
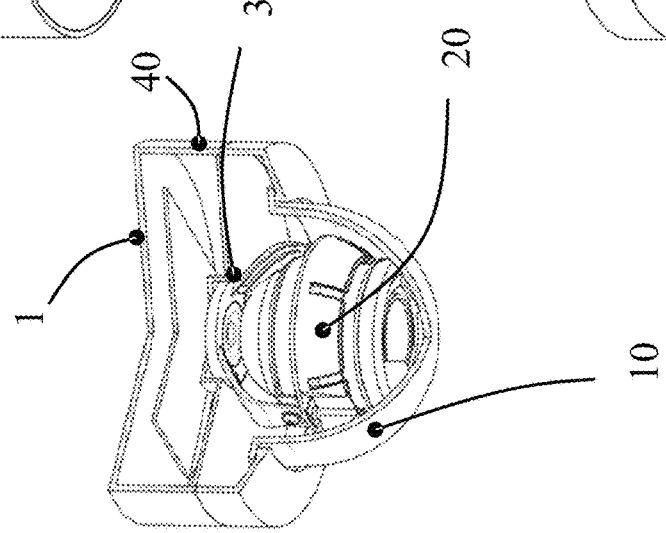
Figure 23A:
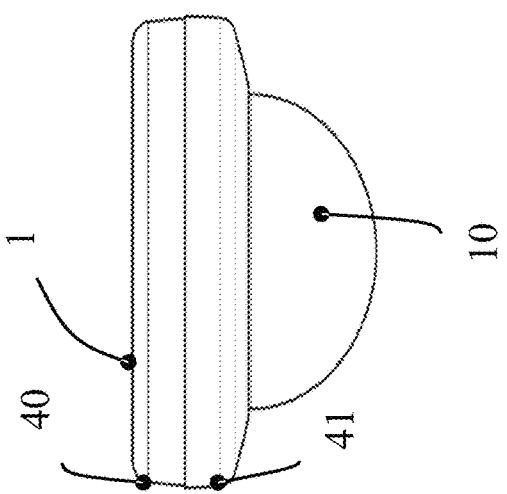
Figure 24:
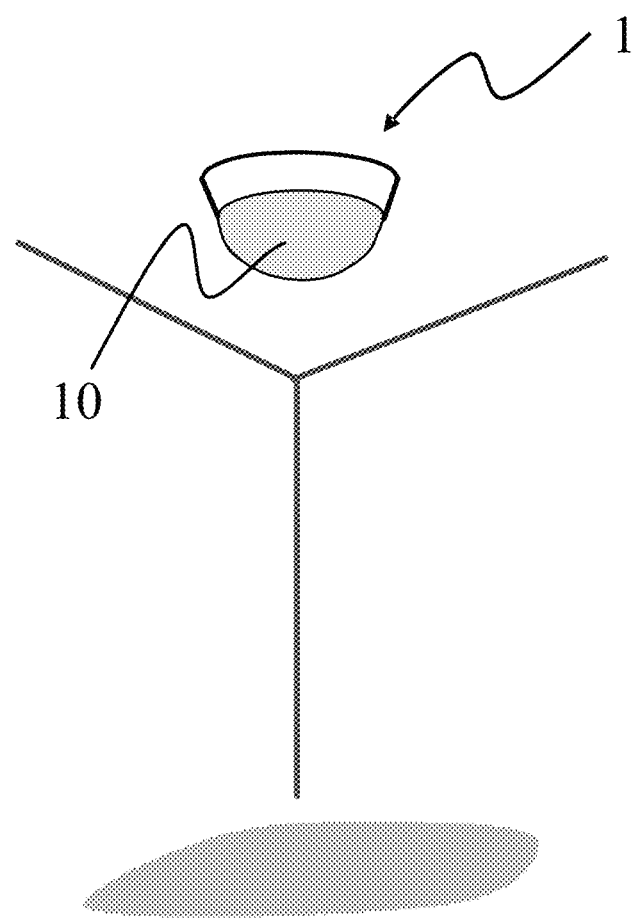
FIG. 24 illustrates an installation example of the image pickup apparatus according to each example.

Referring now to FIGS. 23A-C and 24, a description will be given of the configuration of the image pickup apparatus (dome type camera) 1 according to Examples 1 to 4. FIGS. 23A to 23C illustrate configurations of the image pickup apparatus 1. FIG. 24 illustrates an installation example of the image pickup apparatus 1. The same applies to the image pickup apparatuses 1a and 1b according to Examples 4 to 6 to be described later.

FIG. 23A is an outside appearance view of the image pickup apparatus 1 viewed from the side. As illustrated in FIG. 23A, the hemispherical dome cover 10 is connected to a base member 40 of the dome type camera via a coupling member 41. FIG. 23B is an inside appearance view showing the inside of the image pickup apparatus 1 in which the elements are assembled. As illustrated in FIG. 23B, the camera body 20 is compactly built in the dome cover 10 without interfering with the dome cover 10. Inside the dome cover 10, a pan/tilt driver 30 including driving mechanisms 31 and 32 is connected to the camera body 20 so that the camera body 20 can perform each of pan driving and tilt driving. FIG. 23C is an exploded view for explaining each component incorporated in the image pickup apparatus 1. The driving mechanism 32 for rotating the camera body 20 in the pan direction is incorporated into the base member 40 of the image pickup apparatus 1, and the driving mechanism 32 and the driving mechanism 31 for rotating the camera body 20 in the tilt direction are connected to each other. With such a configuration, the rotation axis when the camera body 20 rotates in the pan direction and the rotation axis when the camera body 20 rotates in the tilt direction intersect at OC, as illustrated in FIG. 1. That is, the rotation center of the camera body 20 is located on the rotation axis O.

Figure 2A:
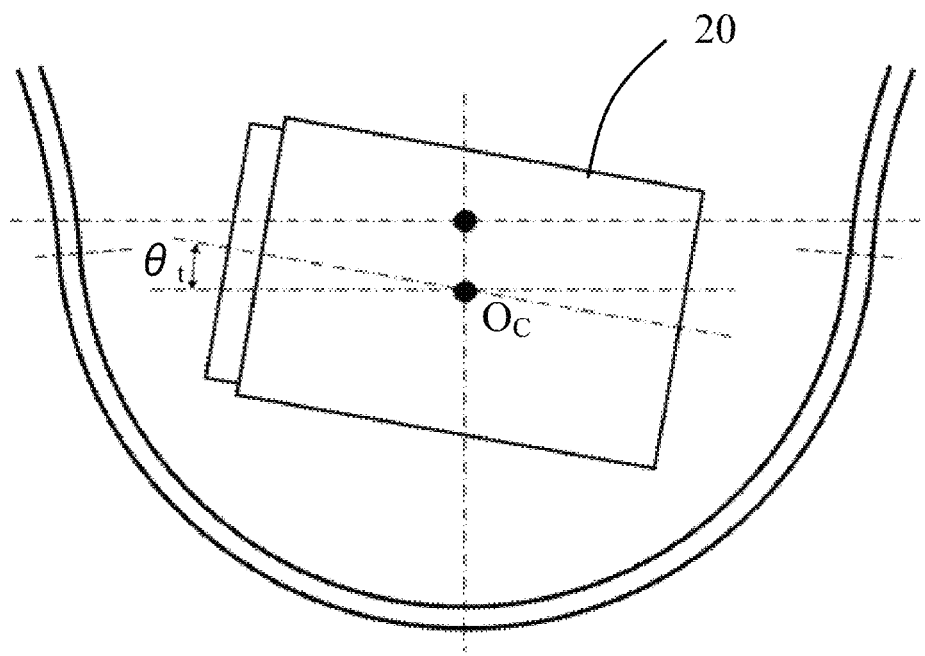
FIGS. 2A and 2B explain states of the image pickup apparatus according to Example 1.
Figure 2B:
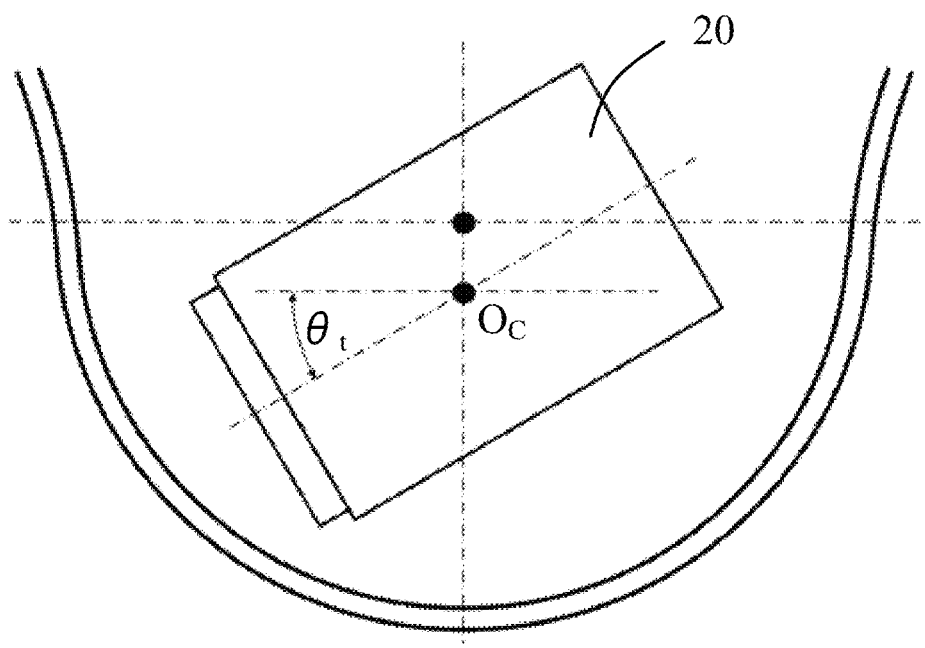
Figure 3A:
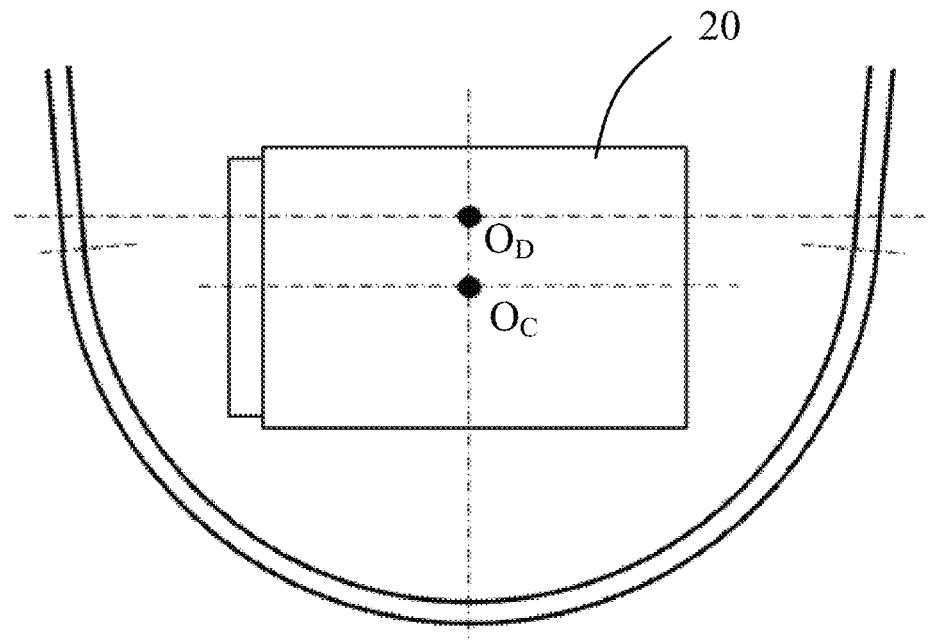
FIGS. 3A and 3B explain states of the image pickup apparatus in comparative example 1.
Figure 3B:
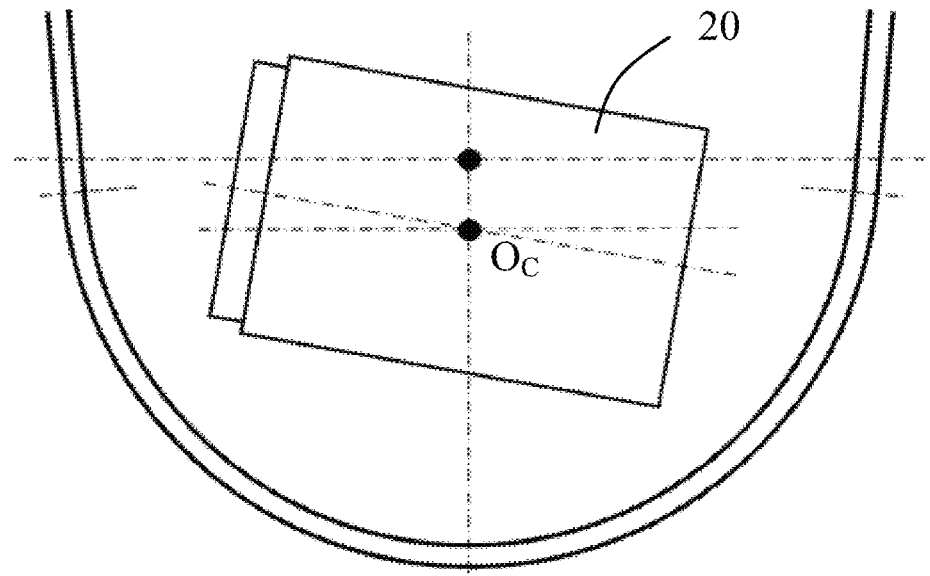

As illustrated in FIG. 24, the image pickup apparatus 1 is installed by connecting the ceiling and the base with each other, and the hemispherical dome cover 10 may face down. Under this installation environment, particularly in long-distance imaging in the telephoto end area of the camera body 20, the camera body 20 may be more frequently used while it faces almost the horizontal direction as illustrated in FIG. 3A than while it faces diagonally downwardly as illustrated in FIG. 2B. FIGS. 2A and 2B illustrate states of the camera body 20 according to Example 1, FIG. 2A illustrates the camera body 20 tilted above the horizon, and FIG. 2B illustrates the camera body 20 tilted below the horizon. FIGS. 3A and 3B illustrate states of the camera body 20 according to comparative example 1, FIG. 3A illustrates the camera body 20 tilted in the horizontal direction, and FIG. 3B illustrates the camera body 20 tilted above the horizon.

When the object to be imaged is located at a position higher than the camera body 20, it may be further rotated in the tilt direction toward the ceiling as the attachment surface from the horizontal direction or in the states illustrated in FIGS. 2A and 3B. In imaging the object at a position higher than the camera body 20, most of the effective light flux of the camera body 20 passes through the aspherical part 10b of the dome cover 10, the astigmatism is corrected in the aspherical part 10b, and thus the good optical performance can be obtained. In FIG. 2A, θt is a tilt angle based on the horizontal direction of the camera body 20, and becomes plus (+) in tilting from the horizontal direction to the ceiling side and minus (−) in tilting downward. Then, the dome cover according to comparative example 1 described with reference to FIGS. 3A, 3B, and 6 would lower the image quality due to the aberration caused by the lens effect of the cylindrical or conical extended shape.

Referring now to FIG. 1, a description will be given of a structure of the dome cover 10 according to Example 1 and the positional relationship between the dome cover 10 and the camera body 20. The dome cover 10 has a spherical part 10a and an aspherical part 10b. The spherical part 10a and the aspherical part 10b are adjacent to each other. $R1_{Da}$ is a radius of curvature of the front surface of the spherical part 10a, $R2_{Da}$ is a radius of curvature of the back surface of the spherical part 10a, and OD represents centers of the spheres on both the front and back surfaces of the spherical part 10a. $R2_{Da}$ is a radius of curvature of the front surface of the aspherical part 10b, and $R2_{Db}$ is a radius of curvature of the back surface of the aspherical part 10b. The aspherical surface portion 10b has a toric surface shape obtained by rotating part of the arc around the rotation axis O as a reference. The radii of curvature of the arcs of the front and back surfaces correspond to $R1_{Db}$ and $R2_{Db}$.

The camera body 20 is rotatable in the pan direction and in the tilt direction around the rotation center OC inside the dome cover 10 by the driving mechanism 31, as illustrated in FIG. 23C. When the camera body 20 images an object within the range of the spherical part 10a of the dome cover 10 and the center of the sphere OD and the rotation center OC are located at the same position, the influence of the aspherical part 10b is stronger due to the tilt angle before the camera body 20 tilts to the horizontal direction. Thus, the rotation center OC is disposed at a position on the rotation axis O that is offset to a side closer to the spherical part 10a of the dome cover 10 from the center of the sphere OD by the distance LO. This configuration can reduce the influence of the aspherical part 10b. The dome cover 10 is made of a thermoplastic resin so that the entire shape of the dome cover 10 has no undercut in order to manufacture the dome cover 10 in a single molding step by injection molding and a mold.

In FIG. 1, $θ_b$ is an angle between a plane S1 orthogonal to the rotation axis O and a line segment LS1 made by connecting the center of the sphere OD and the boundary point P1 (P2) on the surface of the dome cover 10 to each other. The angle $θ_b$ becomes plus (+) when the angle is below the plane S1 orthogonal to the rotation axis O in FIG. 1. When the angle $θ_b$ is above the surface S1 in FIG. 1 or when the angle $θ_b$ is minus (−), the molded dome cover 10 has an undercut shape. Even when the angle $θ_b$ is 0°, it is difficult to release the resin from the mold due to the shrinkage when the melted resin for molding the dome cover 10 is solidified in the mold. Accordingly, in each example, the angle θb has a positive value so as not to form the undercut shape.

Figure 5:
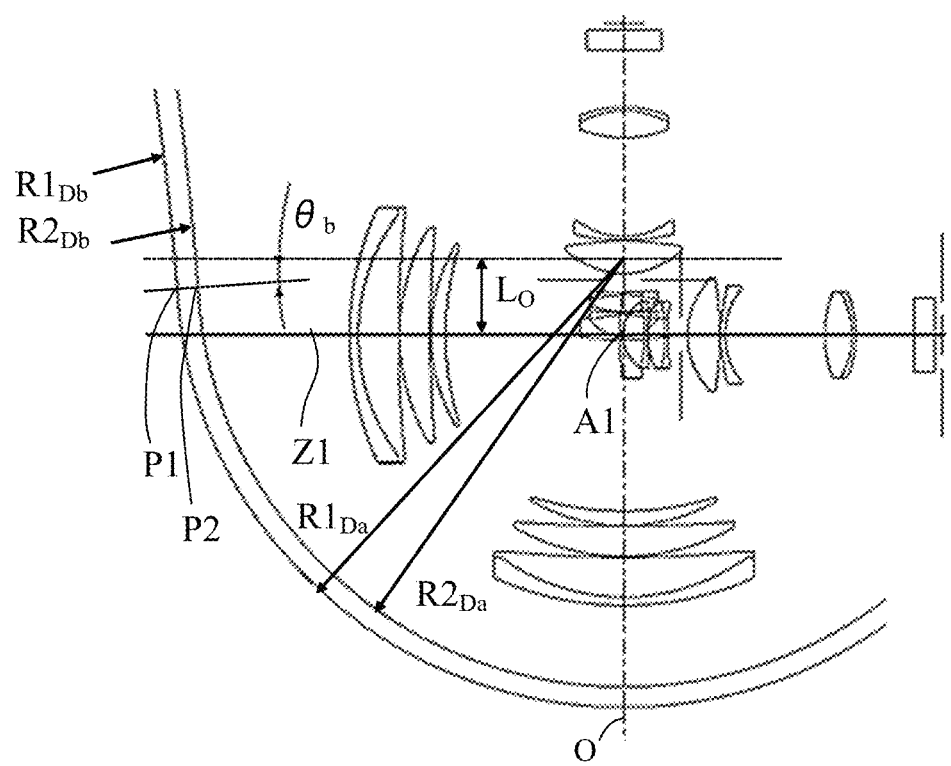
FIG. 5 is a sectional view of the image pickup apparatus according to Example 1.

FIG. 5 is a sectional view of the image pickup apparatus 1 according to Example 1, and illustrates the zoom lens at the telephoto end in a tilted state in a horizontal direction and a vertically down direction. In FIG. 5, an intersection A1 between the center axis Z1 of the zoom lens and the rotation axis O of the aspherical part 10b is the center of rotation of the zoom lens. The image pickup apparatus 1 according to this example is configured so that both LO and $θ_b$ are positive. The aspherical parts 10b on both the front surface and the back surface are shaped so as to move away from the rotation axis O of the aspherical part 10b as the position approaches to the periphery. Neither the spherical part 10a nor the aspherical part 10b adjacent to it has the undercut shape including the boundary points P1 and P2. At the boundary points P1 and P2 between the spherical part 10a and the aspherical part 10b, the tangent line of the spherical part 10a and the tangent line of the aspherical part 10b are configured to be the same straight line. The dome cover 10 has a rotationally symmetric shape around the rotation axis O of the aspherical part 10b. Hence, due to the above configuration, at any of the boundary points P1 and P2, both the tangential planes of the spherical part 10a and the aspherical part 10b become the same plane.

Figure 6:
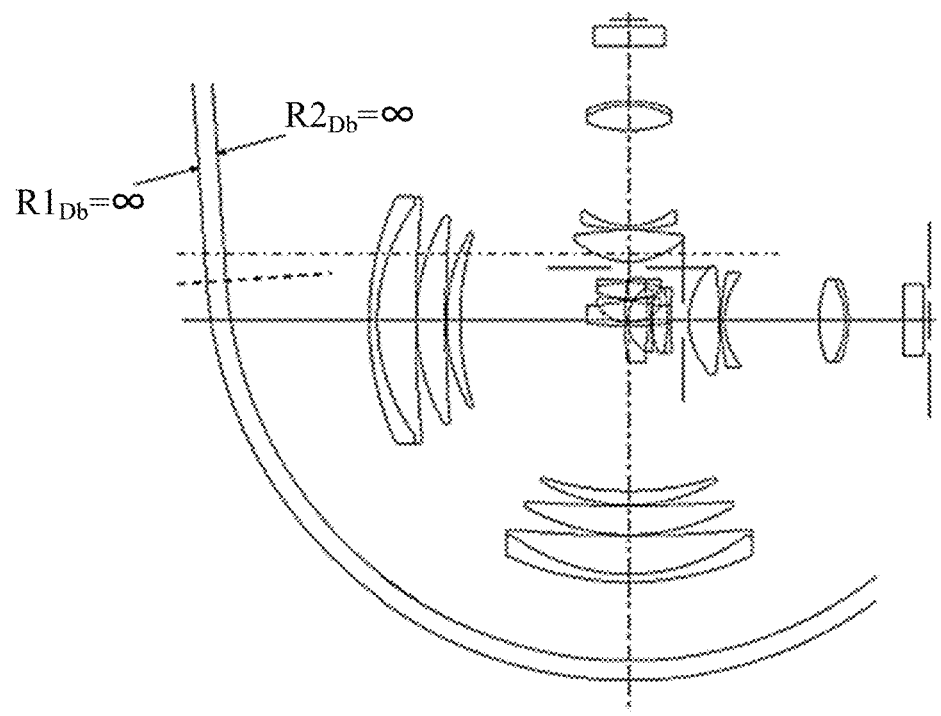
FIG. 6 is a sectional view of an image pickup apparatus according to comparative example 1.

FIG. 6 is a sectional view according to comparative example 1 to Example 1. Comparative example 1 is different from Example 1 in that the curvature radii $R1_{Db}$ and $R2_{Db}$ of the aspherical part 10b are both infinite ∞ or the section of the aspherical part 10b is a straight line on each of both the front surface and the back surface. Comparative example 1 is similar to Example 1 in configuration of the zoom lens, material of the dome cover 10, radii of curvature $R1_{Da}$ and $R2_{Da}$ of the spherical part 10a, distance LO, and angle $\theta_b$. The dome cover 10 is configured as in comparative example 1 has no undercut shape in the molded product, and can be integrally molded and released from the mold. However, the dome cover regarded as an optical element has no refractive power on the section in the paper plane direction of FIG. 6 or the optical power of zero, whereas it has the refractive power approximately equivalent to that of the spherical part 10a on the section orthogonal to it. In other words, the refractive power is different between the section in the direction of the paper surface of FIG. 6 and the section orthogonal to that section. As a result, the aberration caused by the lens effect of the cylindrical or conical extended shape is reflected in the image, and the image quality deteriorates.

On the other hand, when the distance LO has a value of zero or a plus numerical value and the camera body 20 is oriented in the horizontal direction, at least half of the entrance pupil diameter of the lens passes the spherical part 10a and follows the optical path that captures an image on the image plane. Hence, when the camera body 20 faces the horizontal direction, the light flux that has passed through the spherical part 10a maintains the imaging state and thus the imaging performance.

On the other hand, as illustrated in FIGS. 2A and 3B, when the camera body 20 is tilted in the direction in which the angle θt is plus, a light amount passing through the aspherical part 10b in the entrance pupil diameter of the lens increases with the tilt angle and becomes larger than that passing through the spherical part 10a from a certain angle. Thus, when most of the light flux passes through the aspherical part, the influence of the aberration caused by the lens effect increases and the imaging performance deteriorates.

Figure 7:
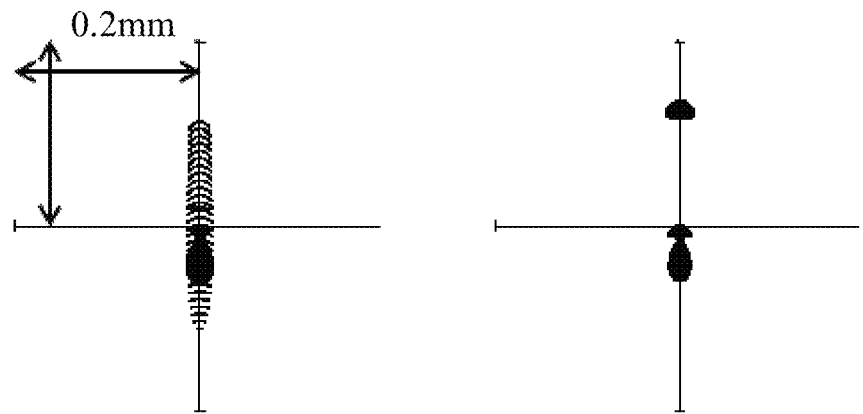
FIG. 7 illustrates spot diagrams according to comparative example 1 and Example 1.

FIG. 7 illustrates spot diagrams on the image plane IP according to comparative example 1 and Example 1, showing the zoom lens located at the telephoto end. Inside the dome cover 10, the camera body 20 is inclined to a side closer to the aspherical part 10b than to the horizontal direction. In other words, both the comparative example 1 and Example 1 have an angle θt of +15°. In FIG. 7, an ordinate axis represents an axis in the direction of the paper in FIGS. 5 and 6, and an abscissa axis represents an axis orthogonal to the direction of the paper. The intersection of the ordinate and abscissa axes is a point on the center axis of the zoom lens. The spot diagram shows an imaging state on the image plane IP of an object that a point.

Many of the surveillance cameras and video cameras detect the contrast in the horizontal direction for the output image in focusing on the image sensor plane, and drive the focus lens so as to obtain the maximum contrast. Hence, when the optical system includes lenses such as a so-called toric lens and a cylinder lens having different focal lengths in two sections as in comparative example 1, only vertical lines in the output image are focused in the image. That is, in the spot diagram, focusing is made at a position that minimizes the width in the horizontal direction. As a consequence, as in comparative example 1 of FIG. 7, the spot significantly extending in the vertical direction is formed on the image sensor plane. On the other hand, Example 1 in FIG. 7 illustrates the spot diagram in focusing on a position that minimizes the horizontal width under the same condition as that of comparative example 1. Compared with comparative example 1, the spot does not extend in the vertical direction, or the aberration is well corrected as in the horizontal direction.

Figure 8:
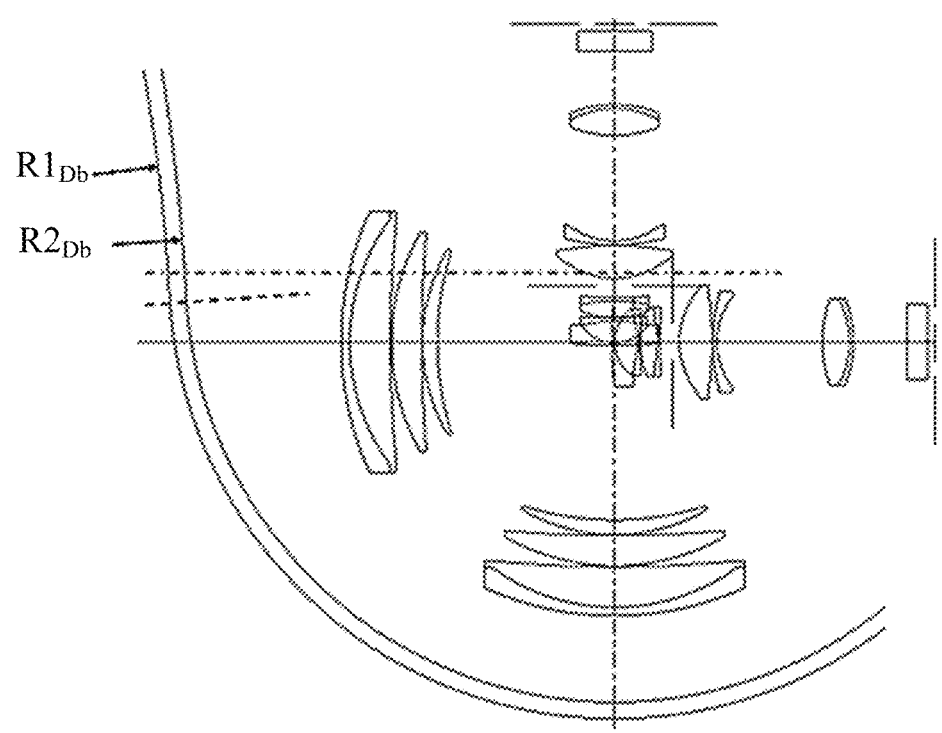
FIG. 8 is a sectional view of the image pickup apparatus according to Example 2.
Figure 9:
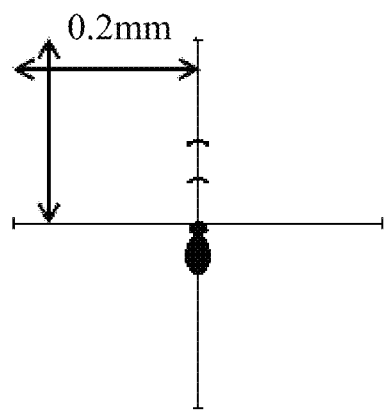
FIG. 9 is a spot diagram according to Example 2.
Figure 10:
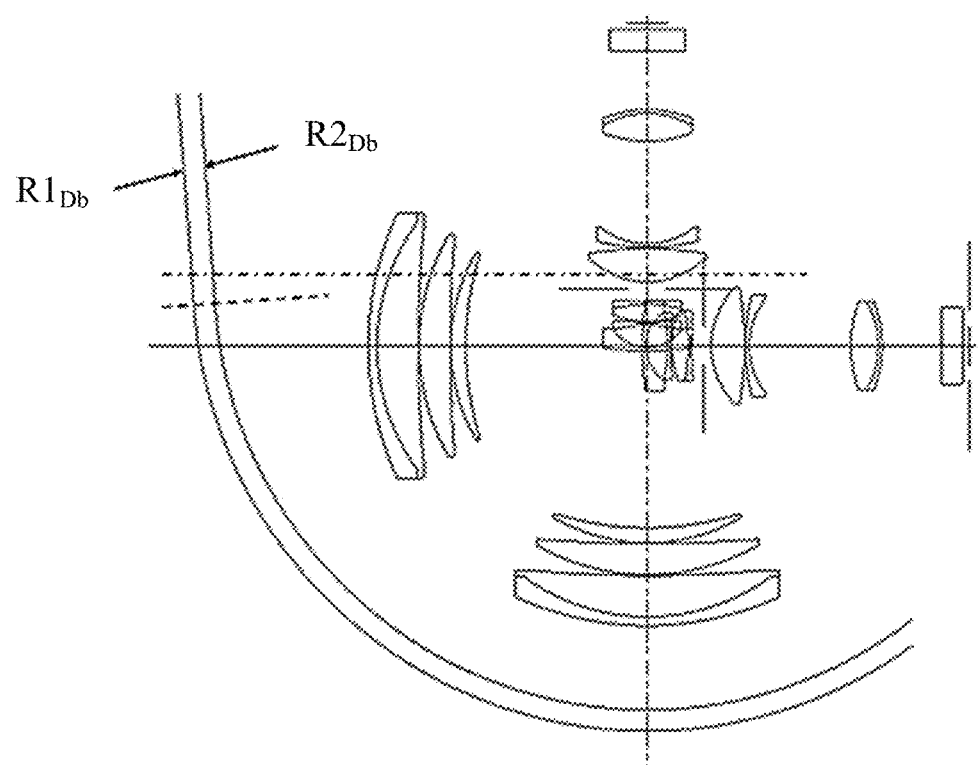
FIG. 10 is a sectional view of an image pickup apparatus according to Example 3.
Figure 11:
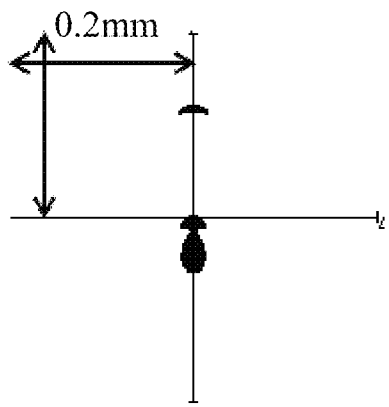
FIG. 11 is a spot diagram according to Example 3.

Referring now to FIGS. 8 to 11, a description will be given of image pickup apparatuses according to Examples 2 and 3. FIG. 8 is a sectional view of the image pickup apparatus according to Example 2. FIG. 9 is a spot diagram according to Example 2. FIG. 10 is a sectional view of the image pickup apparatus according to Example 3. FIG. 11 is a spot diagram according to Example 3. FIGS. 9 and 11 are spot diagrams according to Examples 2 and 3, respectively, under the same condition as that of Example 1. In Example 3, $R2_{Db}=∞$ or the aspherical part 10b on the back surface on the section including the rotation axis O draws a straight line. However, it does not have an undercut shape, but has a shape that can be manufactured in a single molding step by injection molding. By configuring the radius of curvature $R1_{Db}$ in an arc shape that is not infinity ∞, a spot diagram is formed in which the aberration is properly corrected in both the horizontal direction and the vertical direction, similar to Examples 1 and 2.

The image pickup apparatus according to each example is not limited to a surveillance camera, but is applicable to other image pickup apparatuses such as a video camera and a digital camera. As described above, each example can provide a dome cover and an image pickup apparatus including the same, each of which can maintain both the image quality and the light amount in the tilt region of the extended shape portion from the spherical part with a small number of components and a simple configuration. In the zoom lens according to each example, the glass shape and the glass plate number are not limited to the above examples, and are properly variable. Each example may be configured to move part of lenses or lens unit in a directional component orthogonal to the optical axis and thereby to correct image blurs caused by vibrations such as camera shakes. Each example may be configured to correct the distortion and the chromatic aberration by an electric corrector. In each embodiment, the configuration and optical specification (angle of view and F-number) of the dome cover can be changed as appropriate.

An image pickup system (monitoring system) including the camera body according to each example and a controller that controls the camera body may be configured. Then, the controller can control the rotation of the camera body (pan/tilt driving), and the movement of each lens unit during zooming, focusing, image stabilizations, and the like of the zoom lens. The controller does not need to be integrated with the camera body and may be separated from it. For example, a controller (control device) disposed far from a driver that drives the camera body may include a transmission unit that sends a control signal (command) for controlling the camera body. Such a controller can remotely control the camera body.

The controller may include an operation unit such as a control device or a button for remotely controlling the camera body, and the camera body may be controlled in accordance with an input to the operation unit by the user. For example, the operation unit may include a scaling button, and the signal may be transmitted to the driver for the camera body so as to increase the magnification of the zoom lens when the user presses the scaling-up button, and to decrease the magnification of the zoom lens when the user presses the scaling-down button.

The image pickup system may include a display, such as a liquid crystal panel, that displays information (rotational state) on the panning and tilting of the camera body and zoom related information (moving state) of the zoom lens. The zoom related information of the zoom lens includes, for example, a zoom magnification (zoom state) and a moving amount (moving state) of each lens unit. In this case, the user can remotely control the camera body via the operation unit while viewing the information shown on the display. Then, the display and the operation unit may be integrated with each other, for example, through a touch panel.

Next follows numerical examples corresponding to the respective examples. A description will now be given of numerical examples without the dome cover 10 in the zoom lens 21 used in each example. In each numerical example, surface numbers are shown in order from the object side to the image side, r is a radius of curvature, d is a distance or interval, and nd and vd are a refractive index and an Abbe number, respectively, based on the d-line. "*" means an aspherical surface. In each numerical example, two surfaces closest to the image are flat surfaces corresponding to a glass block (optical block) G.

The aspherical shape is expressed with a displacement x in the optical axis direction at a position of height h from the optical axis based on the surface vertex as follows: $x=(h^2/r)/[1+\{1-(1+K)(h/r)^2\}^{1/2}]+A4 \cdot h^4+A6 \cdot h^6+A8 \cdot h^8+A10 \cdot h^{10}+A12 \cdot h^{12}$. Herein, r is a paraxial radius of curvature, K is a conic constant, and A4, A6, A8, A10, and A12 are fourth-order, sixth-order, eighth-order, tenth-order, and twelfth-order aspherical coefficients, respectively. For example, "e-Z" means "$10^{-Z}$". The angle of view is a numerical value of a half angle of view (ω) relating to an imageable angle of view in consideration of the distortion.

[Zoom Lens Numerical Values]

Unit: mm

Surface data

| Surface number | r | d | nd | vd |
|---|---|---|---|---|
| 1 | 45.340 | 1.25 | 2.00069 | 25.5 |
| 2 | 30.070 | 5.85 | 1.49700 | 81.5 |
| 3 | 176.956 | 0.15 | | |
| 4 | 31.963 | 4.42 | 1.59522 | 67.7 |
| 5 | 197.840 | 0.10 | | |
| 6 | 26.575 | 2.12 | 1.59522 | 67.7 |
| 7 | 43.716 | (variable) | | |
| 8 | 49.443 | 0.45 | 2.00100 | 29.1 |
| 9 | 5.843 | 3.17 | | |
| 10 | −18.179 | 0.40 | 1.91082 | 35.3 |
| 11 | 43.885 | 0.12 | | |
| 12 | 13.400 | 2.42 | 1.95906 | 17.5 |
| 13 | −21.705 | 0.40 | 1.91082 | 35.3 |
| 14 | 46.734 | (variable) | | |
| 15(stop) | ∞ | 1.00 | | |
| 16* | 10.759 | 4.79 | 1.69350 | 53.2 |
| 17* | −37.365 | 0.10 | | |
| 18 | 28.102 | 0.55 | 2.00100 | 29.1 |
| 19 | 10.770 | (variable) | | |
| 20* | 16.499 | 3.98 | 1.55332 | 71.7 |
| 21 | −12.410 | 0.50 | 1.94595 | 18.0 |
| 22 | −17.197 | (variable) | | |
| 23 | ∞ | 3.00 | 1.51633 | 64.1 |
| 24 | ∞ | 1.00 | | |
| Image plane | ∞ | | | |

Aspheric Data

Sixteenth surface

K = −1.03526e+000
A5 = 8.04291e−007 A7 = 5.49169e−008 A9 = −7.95157e−010
A11 = 1.59096e−012

Seventeenth surface

K = −1.56411e+001
A5 = 5.68090e−006 A7 = −5.19224e−008

Twentieth surface

K = 4.09148e−002 A 4 = −6.34315e−005 A 6 = −1.71996e−007
A 8 = −2.89251e−010

Various Data

Zoom ratio 29.49

| | Wide-angle | intermediate | telephoto |
|---|---|---|---|
| Focal length | 4.49 | 43.47 | 132.37 |
| F-number | 1.44 | 2.74 | 4.60 |
| View angle | 33.76 | 3.95 | 1.30 |
| Image height | 3.00 | 3.00 | 3.00 |
| Overall lens length | 84.70 | 84.70 | 84.70 |
| BF | 14.18 | 21.62 | 6.84 |
| d7 | 0.60 | 20.77 | 25.20 |
| d14 | 26.40 | 6.23 | 1.80 |
| d19 | 11.75 | 4.31 | 19.09 |
| d22 | 11.20 | 18.64 | 3.86 |

Zoom lens unit data

| unit | starting surface | focal length |
|---|---|---|
| 1 | 1 | 37.44 |
| 2 | 8 | −5.71 |
| 3 | 15 | 27.79 |
| 4 | 20 | 18.24 |

Next follows numerical examples of the dome covers according to Examples 1 to 3 and comparative example 1. LO is a distance in the rotation axis direction of the aspherical part 10b between the center of the sphere of the spherical part 10a in the dome cover 10 and the rotation center of the camera body 20. $R1_{Da}$ is a radius of curvature of the spherical part 10a on the surface of the dome cover 10. $R2_{Da}$ is a radius of curvature of the spherical part 10b on the back surface of the dome cover 10. $R1_{Db}$ is a radius of curvature on a section including the rotation axis of the aspherical part 10b on the surface of the dome cover 10. $R2_{Db}$ is a radius of curvature on a section including the rotation axis of the aspherical part 10b on the back surface of the dome cover 10. $R1_{Db}=\infty$ and $R2_{Db}=\infty$ mean that a straight line is drawn on the section including the rotation axis of the aspherical part 10b on the back surface of the dome cover 10. θb is an angle between a straight line orthogonal to the rotation axis and a straight line made by connecting the center of the sphere OD with a boundary point between the spherical part and the aspherical part on an arbitrary section including the rotation axis. t is the distance between the front surface and the back surface of the dome cover 10 on the rotation axis of the aspherical part 10b.

Numerical Example 1

LO=10.0 mm
$R1_{Da}$=65.0 mm
$R2_{Da}$=62.0 mm
$R1_{Db}$=413.0 mm
$R2_{Db}$=500.0 mm
θb=4°
t=3.0 mm

Numerical Example 2

LO=10.0 mm
$R1_{Da}$=64.9 mm
$R2_{Da}$=62.5 mm
$R1_{Db}$=275.0 mm
$R2_{Db}$=300.0 mm
θb=3°
t=2.4 mm

Numerical Example 3

LO=10.0 mm
$R1_{Da}$=65.0 mm
$R2_{Da}$=62.0 mm
$R1_{Db}$=2450.0 mm
$R2_{Db}$=∞
θb=4°
t=3.0 mm

Comparative Example 1

LO=10.0 mm
$R1_{Da}$=65.0 mm
$R2_{Da}$=62.0 mm
$R1_{Db}$=∞
$R2_{Db}$=∞
θb=4°
t=3.0 mm

The numerical value of the conditional expression (1) in each example will be shown below.

| |Fm/Fd| Conditional Expression (1): |
|---|---|
| Example 1 | 1.131 |
| Example 2 | 1.279 |
| Example 3 | 1.152 |

Examples 1 to 3 can provide a dome cover, an image pickup apparatus, and an image pickup system, each of which can maintain both the image quality and the light amount with a simple configuration.

Examples 4 to 6

Figure 12:
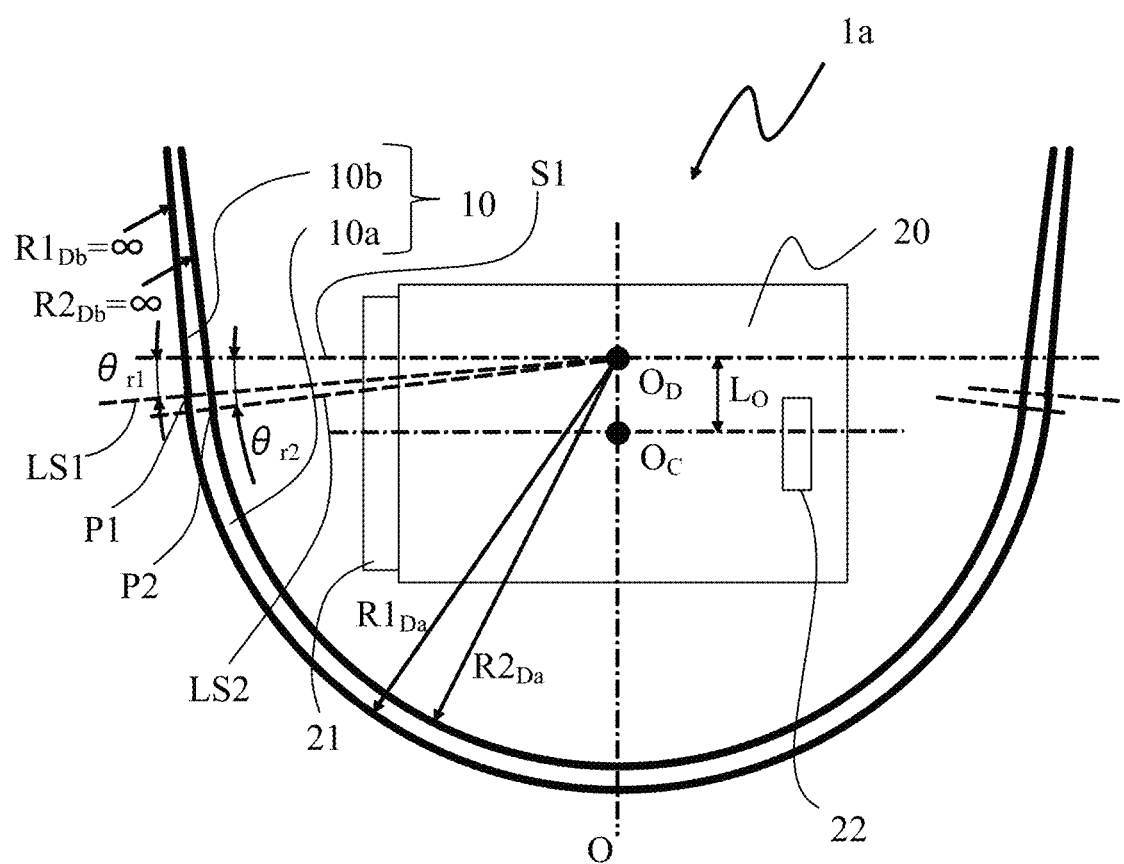
FIG. 12 is a sectional view of an image pickup apparatus according to Example 4.
Figure 13:
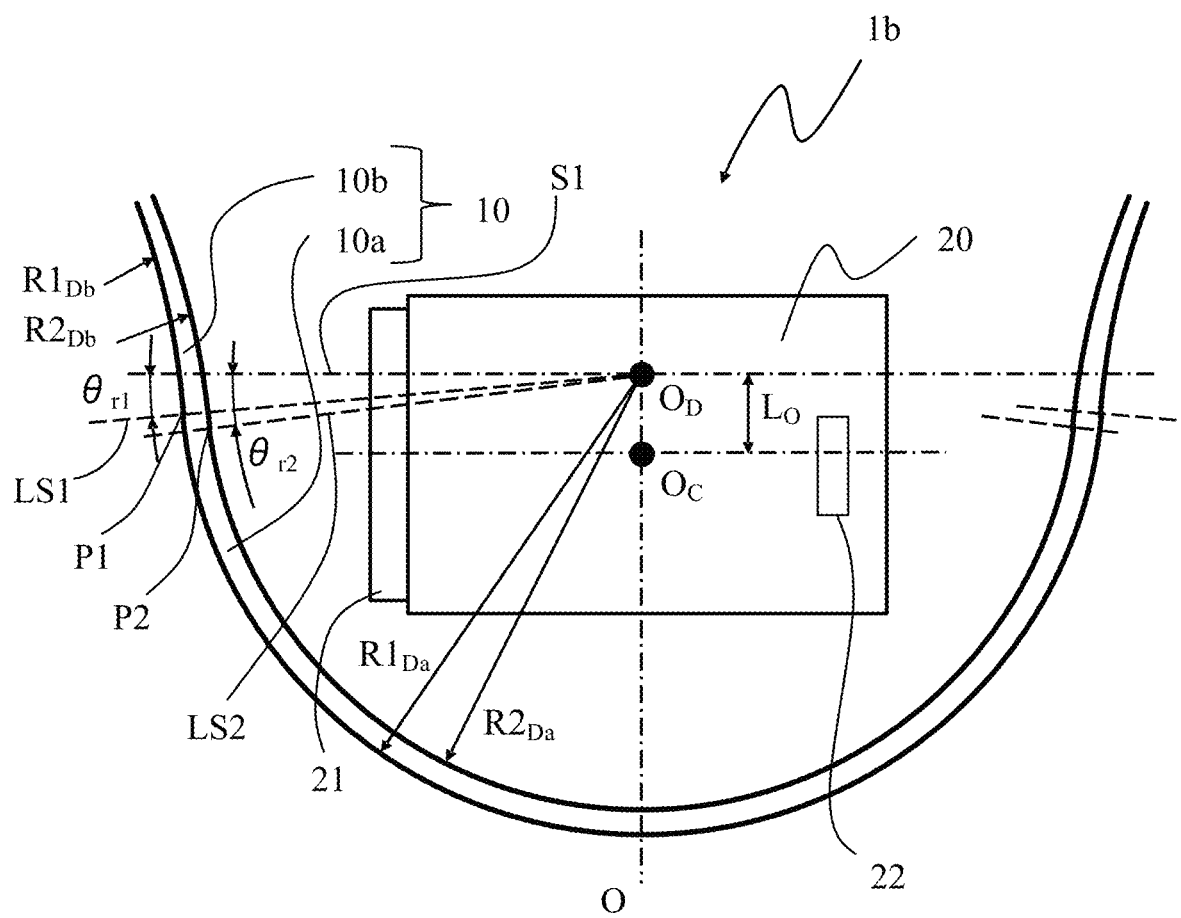
FIG. 13 is a sectional view of the image pickup apparatus according to Example 5.

Referring now to FIGS. 12 and 13, a description will be given of image pickup apparatuses according to Examples 4 to 6. FIG. 12 is a sectional view of an image pickup apparatus 1a according to Example 4. FIG. 13 is a sectional view of an image pickup apparatus 1b according to Example 5. The image pickup apparatus 1a in FIG. 12 has curvature radii $R1_{Db}$ and $R2_{Db}$ of the front and back surfaces of the aspherical part 10b of infinite ∞, respectively, and is different from the image pickup apparatus that has certain finite radii of curvature $R1_{Db}$ and $R2_{Db}$. Since other configurations of the image pickup apparatuses 1a and 1b are the same, the image pickup apparatus 1a will be described for the same configuration.

The image pickup apparatus 1a includes a camera body 20 including an optical system (image pickup optical system, lens apparatus), an image sensor (light receiving element, image pickup element), and a housing (holding member) for holding the optical system and the image sensor, and a dome cover 10 that covers the camera body 20. In this embodiment, the optical system may be attachable to and detachable from the camera (image pickup element) as the lens apparatus.

The dome cover 10 has a spherical part 10a and an aspherical part 10b. The spherical part 10a and the aspherical part 10b are adjacent to each other at boundary points (arbitrary boundary points) P1 and P2 on the front surface (outer surface) and the back surface (inner surface) of the dome cover 10, respectively. Herein, the boundary points P1 and P2 are points at which the direction and radius of curvature change or the points at which the curvature changes. The aspherical part 10b has a rotationally symmetrical shape with respect to the rotation axis O including the center of the sphere OD of the surface of the spherical part 10a. The distance from the rotation axis O to the aspherical part 10b increases as the distances from the boundary points P1 and P2 increase. In the spherical part 10a, an angle between the line segment LS1 made by connecting the center of the sphere OD and the boundary point P1 on the surface of the dome cover 10 and the rotation axis O is less than 90°. Due to this configuration, the dome cover 10 has a shape with no undercut portion and thus the dome cover 10 can be configured by a single component because it can be integrally formed by molding with a thermoplastic resin and a mold.

The following conditional expression (2) is satisfied:

$$0.00<\theta_{r2}-\theta_{r1}<1.00 \quad (2)$$

where $\theta_{r1}$ (°) is an angle between a plane S1 orthogonal to the rotation axis O and the line segment LS1 made by connecting the center of the sphere OD and the boundary point P1 on the surface of the dome cover 10, and $\theta_{r2}$ (°) is an angle between the plane S1 and a line segment LS2 made by connecting the center of the sphere OD and the boundary point P2 on the back surface of the dome cover 10.

The conditional expression (2) defines a relative angle between the front surface and the back surface of the aspherical part 10b of the dome cover 10, and a condition for making the double image phenomenon less conspicuous in the tilt region near the horizontal direction. The double image phenomenon is originally caused by the aspherical part 10b having a predetermined angle in the cutting direction during the molding process to eliminate the undercut portion. If the aspherical part 10b has the angle of 0° or higher, a ray offset occurs only in the aspherical surface portion 10b when a parallel flat plate inclined at the angle is inserted into the ray going from the object point to the camera body 20. Among the light flux incident on the camera body 20, the spherical part 10a does not have the above offset. Hence, when the incident light flux contacts both the spherical part 10a and the aspherical part 10b, only part of the light flux is offset and two imaging points are generated on the image plane.

Accordingly, this embodiment intentionally make different the boundary points (points where the curvature direction or radius of curvature changes or curvature changing points) between the aspherical part 10b and the spherical part 10a on the front surface and the back surface of the dome cover 10. Thereby, the aspherical part 10b has a relative angle difference between the front surface and the back surface, and the light traveling direction changes when the light flux passes through the aspherical part 10b. By defining the relative angle between the front surface and the back surface so that the offset direction of the light flux, which causes the double image phenomenon, and the traveling direction at the time of emission from the back surface are opposite to each other, an image point at which the light flux of the spherical part 10a forms an image and an image point where the light flux of the aspherical surface portion 10b forms an image can be made closer to each other.

If the value is higher than the upper limit of the conditional expression (2), the relative angle becomes too high, and a change of the traveling direction that occurs when the light flux passes through the aspherical part 10b becomes too large. As a result, a positional relationship between the two imaging points on the image plane is reversed, and the distance between the two imaging points becomes disadvantageously long. On the other hand, if the value is lower than the lower limit of the conditional expression (2), the ray offset direction generated with the aspherical part 10b having no undercut portion, and the image point moving direction generated by the relative angle difference between the front surface and the back surface become the same direction. As a result, the distance between the two imaging points becomes disadvantageously long.

The following conditional expression (2a) may be satisfied.

$$0.05<\theta_{r2}-\theta_{r1}<0.70 \quad (2a)$$

The following conditional expression (2b) may be satisfied.

$$0.09<\theta_{r2}-\theta_{r1}<0.30 \quad (2b)$$

This embodiment can provide a dome cover, and an image pickup apparatus having the same, each of which can make the double image phenomenon less conspicuous in a tilt region near the horizontal direction with a simple configuration with a small number of components.

The tangential plane of the spherical part 10a and the tangential plane of the aspherical part 10b at the boundary points P1 and P2 are the same plane. That is, the spherical part 10a and the aspherical part 10b have the same plane at each of the arbitrary boundary points P1 and P2. Thereby, the spherical part 10a and the aspherical part 10b are smoothly connected to each other, suppress flares or ghosts that would occur when the connection portions at the boundary points P1 and P2 become discontinuous, and can effectively maintain the image quality.

The respective centers of the spheres OD (center points) of the front surface and the back surface of the spherical part 10a are disposed on the rotation axis O. Thereby, in the spherical part 10a of the dome cover 10, the distance between the front surface and the back surface or the thickness of the dome cover 10 becomes constant in the direction orthogonal to the rotation axis O. When the camera body 20 rotates in a direction orthogonal to the rotation axis O, the focal length of the dome cover 10 can be maintained constant. As a result, when the camera body 20 rotates, changes in the focus position and image quality can be effectively suppressed.

The respective rotation axes O of the front surface and the back surface of the aspherical part 10b may be common (disposed on the same straight line). Thereby, in the aspherical part of the dome cover 10, the distance between the front surface and the back surface or the thickness of the dome cover 10 becomes constant in the direction orthogonal to the rotation axis O. Therefore, when the camera body 20 rotates in a direction orthogonal to the rotation axis O, the focal length of the dome cover 10 can be maintained constant. As a result, when the camera body 20 rotates, fluctuations in the focus position and image quality can be effectively suppressed.

The material of the dome cover 10 may be a thermoplastic resin such as polycarbonate. Thereby, the mold for forming the shape of the dome cover 10 is manufactured, and the dome cover 10 can be manufactured by an injection molding process for melting, injecting, and solidifying the thermoplastic resin. Since the dome cover 10 can be manufactured by injection molding, the dome cover 10 can be manufactured as an integrated component by continuous molding under the same conditions under the environment in which the quality is less likely to scatter.

On the section including the rotation axis O according to Examples 5 and 6, the front and back surfaces of the aspherical part 10b draw arcs (so-called toric surface shapes). By forming each of the front surface and the back surface of the dome cover 10 in a toric surface shape, the focal length of the aspherical part 10b on a section orthogonal to the rotation axis O and the aspherical part 10b on a section orthogonal to that section (orthogonal to the rotation axis O) can be set independently of each other. Hence, the astigmatism can be properly corrected, which is an aberration caused by the lens effect of the cylindrical or conical extended shape.

The following conditional expression (3) may be satisfied:

$$0.40<|fm/fd|<1.80 \quad (3)$$

where fd is a focal length of the spherical part 10a and fm is a focal length of the aspherical part 10b on the section including the rotation axis O.

The conditional expression (3) defines a ratio between the focal length fm on the section including the rotation axis O of the aspherical part 10b and the focal length fd of the spherical part 10a, and properly corrects the astigmatism. When the value is higher than the upper limit of the conditional expression (3), the focal length fm of the section including the rotation axis O of the aspherical part 10b becomes excessively long and the astigmatism becomes insufficiently corrected. On the other hand, when the value is lower than the lower limit of the conditional expression (3), the focal length fm of the section including the rotation axis O of the aspherical part 10b becomes excessively short, and astigmatism is excessively corrected. If the astigmatism is insufficiently or excessively corrected, a difference becomes large between the in-focus position on the section including the rotation axis O and the in-focus position on the section orthogonal to that section, and the image quality deteriorates.

When the value of conditional expression (3) is around 1.0, the astigmatism is corrected when the camera body 20 is oriented in the horizontal direction. On the other hand, in a surveillance camera, in many cases, the driving center of the pan or tilt drive of the camera body 20 is offset to the dome surface side more spherical than the center of the spherical part 10a in order to reduce the size of the spherical part 10a from the center of the spherical part 10a in order to reduce the size of the entire apparatus and the influence of the aspherical part 10b. Thus, when the camera body 20 is oriented in the horizontal direction, most of the effective light flux of the camera body 20 particularly in the telephoto range passes through the spherical part 10a. The imaging state of the light flux that has passed through the spherical part 10a has more influential on the resolution performance obtained when the camera body 20 is oriented in the horizontal direction than the imaging state of the light flux that has passed through the aspherical part 10b.

In order to correct the astigmatism caused by the effect of the aspherical part 10b, the astigmatism may be corrected when the camera body 20 is tilted to such an extent that most of the effective light flux of the camera body 20 passes through the aspherical part 10b further than when the camera body 20 is oriented in the horizontal direction. When the camera body 20 is tilted to such an extent that most of the effective light flux of the camera body 20 passes through the aspherical part 10b, the aspherical part 10b is inclined obliquely relative to the optical axis of the camera body 20. Hence, the optical path length in the dome cover 10 is longer than that when the camera body 20 is oriented in the horizontal direction.

The refractive power on the section including the rotation axis of the aspherical part 10b may be set to a proper refractive power with respect to an increase in optical path length due to the tilt. That is, it is not the same as the refractive power of the spherical part 10a, and by satisfying the conditional expression described below, the astigmatism can be properly corrected when the camera body 20 is tilted to such an extent that most of the effective light flux of the camera body 20 passes through the aspherical part 10b. When the astigmatism is insufficiently or excessively corrected, the difference becomes large between the focus position on the section including the rotation axis and the focus position on the section orthogonal to that section, and the image quality thereby deteriorates.

The following conditional expression (3a) may be satisfied.

$$1.12 < |fm/fd| < 1.50 \quad (3a)$$

The following conditional expression (3b) may be satisfied.

$$1.20 < |fm/fd| < 1.30 \quad (3b)$$

By making each of the front surface and the back surface of the dome cover 10 in a toric surface shape, Examples 5 and 6 can make the double image phenomenon less conspicuous and properly correct the astigmatism.

The image pickup apparatus 1a includes an image sensor 22 that photoelectrically converts an optical image (image of a subject) formed by the image pickup optical system (zoom lens) 21 and outputs image data. The image sensor 22 includes a CCD (Charge Coupled Device) sensor or a CMOS (Complementary Metal Oxide Semiconductor) sensor for digitally processing the image.

Figure 15:
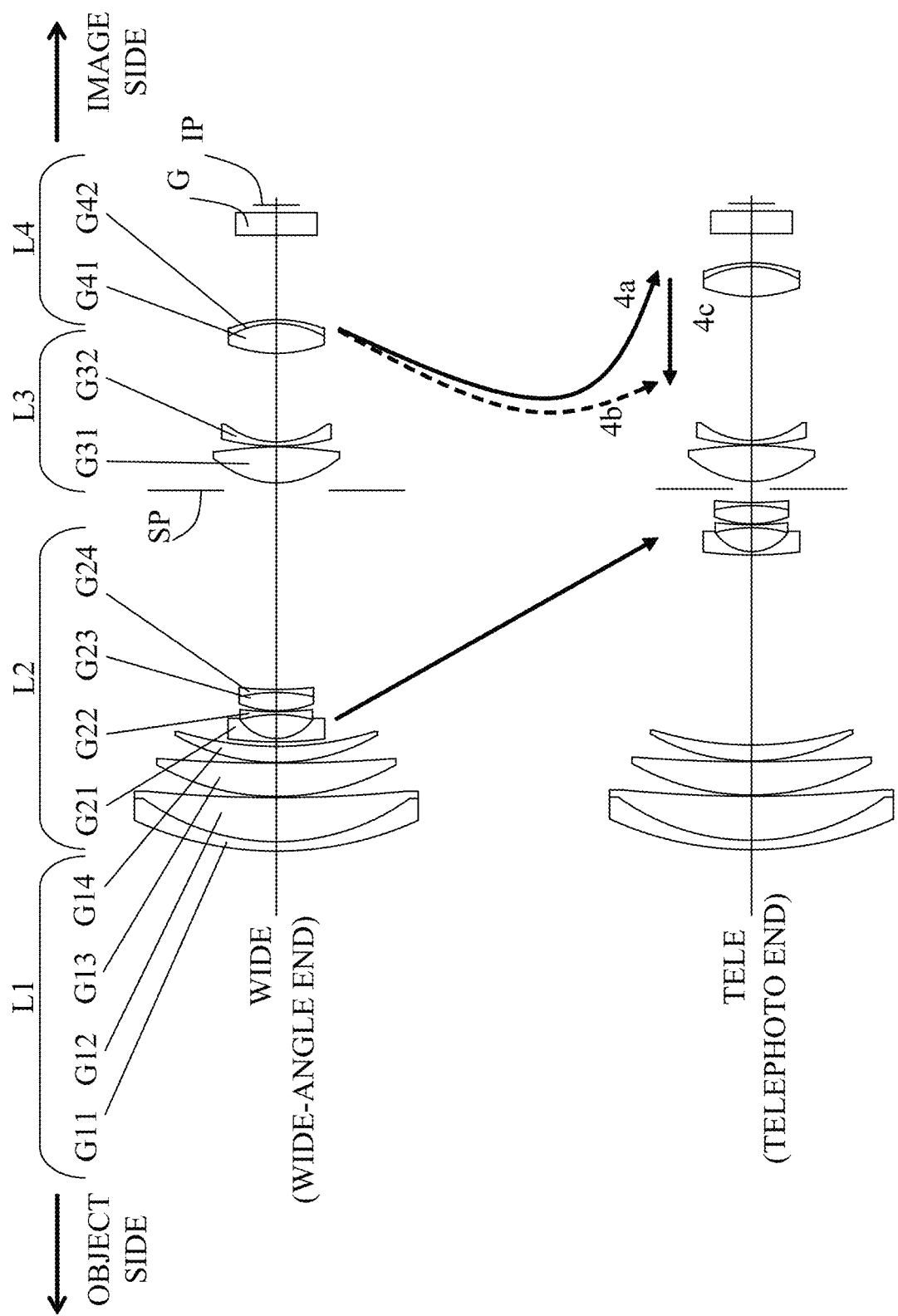
FIG. 15 is a sectional view of a zoom lens according to Example 4 to 6.

Referring now to FIG. 15, a description will be given of the configuration of the image pickup optical system (zoom lens) 21 according to this example. FIG. 15 is a sectional view of the zoom lens 21. The zoom lens 21 includes, in order from the object side to the image side, a first lens unit L1, a second lens unit L2, an aperture stop SP, a third lens unit L3, and a fourth lens unit L4. G is a glass block. IP is an image plane (imaging plane), and corresponds to an imaging plane of the image sensor 22. The zoom lens 21 is used for, but not limited to, an image pickup apparatus such as a surveillance camera, a digital camera, and a video camera.

In FIG. 15, the left side is the object side, the right side is the image side. The wide-angle end and the telephoto end refer to zoom positions when the magnification varying lens unit is located at both ends in a mechanically movable range on the optical axis. Each lens unit moves from the wide-angle end to the telephoto end along a trajectory as indicated by an arrow (solid line) illustrated in FIG. 15. Each lens unit moves from the wide-angle end to the telephoto end along the trajectory as indicated by the arrow (solid line) illustrated in FIG. 15. The solid curve and dotted curve of the fourth lens unit L4 are moving trajectories for correcting the image plane fluctuation at zoom positions from the wide-angle end to the telephoto end in focusing on an object at infinity and an object at a short distance, respectively. In focusing from the object at infinity to the object at the short distance at the zoom position of the telephoto end, the fourth lens unit L4 is moved as indicated by an arrow 4c in FIG. 15.

The aperture stop SP is disposed on the object side of the third lens unit L3, and fixed with the third lens unit L3 during the magnification variation. When the third lens unit L3 includes a plurality of lenses, the stop SP may be disposed in the third lens unit L3. The aperture stop SP may be independently moved so as to cut an off-axis marginal ray at each zoom position during the magnification variations, to cut the coma flare, and thereby to obtain better optical performance.

The first lens unit L1 includes a cemented lens formed by joining a negative lens G11 that has a meniscus shape and a concave surface on the image side and a positive lens G12 that has a convex surface on the object side, a positive lens G13 that has a convex surface on the object side, and a positive lens G14 that has a meniscus shape and a convex surface on the object side. Using the three positive lenses G12, G13, and G14, this embodiment can obtain the refractive power required for the first lens unit L1 without excessively increasing the refractive power of the lens surface of each lens. This embodiment can effectively reduce the spherical aberration, the coma aberration, the axial chromatic aberration, and the like at the telephoto end, which are likely to be problems particularly in a high magnification variation.

The second lens unit L2 includes a negative lens G21 that has a meniscus shape and a concave surface on the image side, a negative lens G22 having concave surfaces on both sides, and a cemented lens formed by joining a positive lens G23 having convex surfaces on both sides and a negative lens G24 having concave surfaces on both sides. This lens configuration can effectively correct the field curvature at the wide-angle end, the lateral chromatic aberration over the entire zoom range, and the spherical aberration at the telephoto end.

The third lens unit L3 includes a positive lens G31 that has convex surfaces on both sides and an aspherical shape on both sides, and a negative lens G32 that has a convex surface on the object side, a concave surface on the image side, and a meniscus shape. This lens configuration can effectively correct the spherical aberration at the wide-angle end.

The fourth lens unit L4 includes a cemented lens formed by joining a positive lens G41 that has convex surfaces on both sides and an aspheric surface on the object side, and a negative lens G42 that has a concave surface on the object side, a convex surface on the image side, and a meniscus shape. This lens configuration can reduce the fluctuations in field curvature and astigmatism generated during focusing.

Figure 14A:
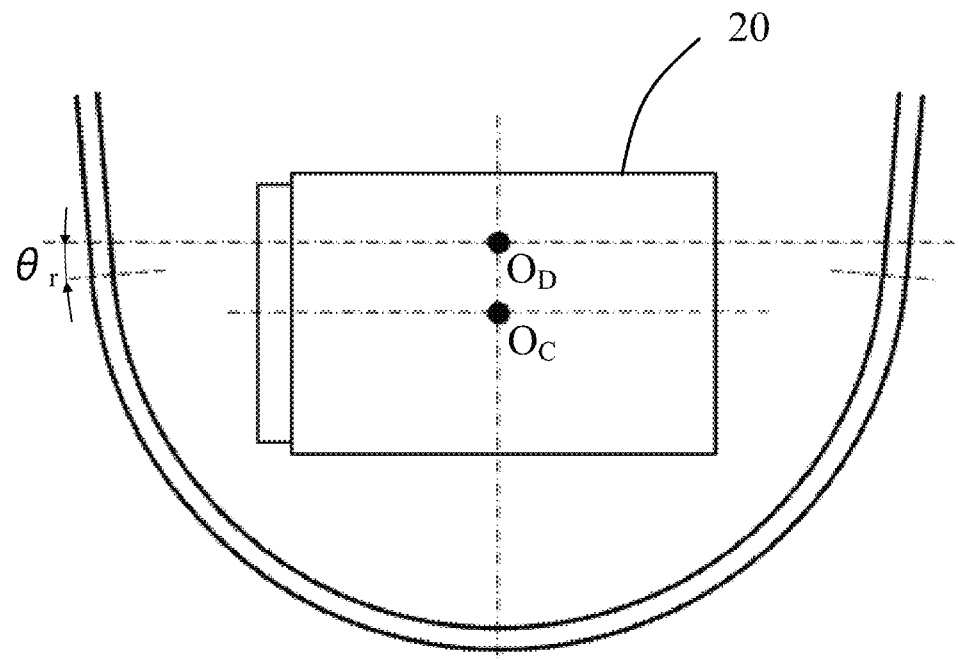
FIGS. 14A and 14B explain states of the image pickup apparatus according to comparative example 2.
Figure 14B:
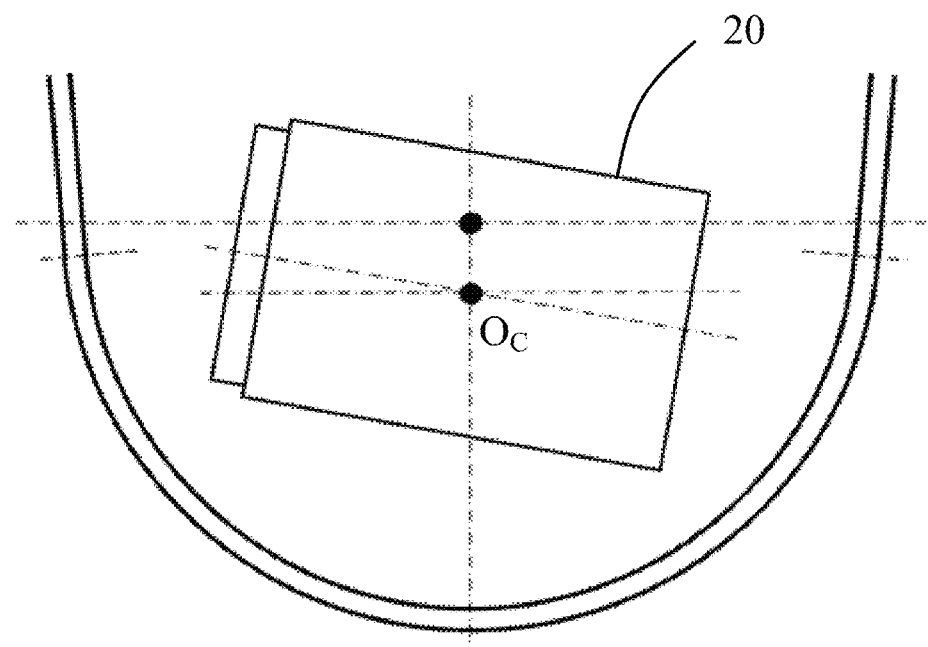

In FIGS. 23A to 23C and 24, when the object to be imaged is located at a position higher than the camera body 20, it may be further rotated in the tilt direction from the state illustrated in FIG. 14A toward the ceiling as the attachment surface from the horizontal direction or toward the state illustrated in FIG. 14B. In such a case, the use of the dome covers according to comparative example 2 with reference to FIG. 16 and comparative example 3 with reference to FIG. 19 can offset the light ray at the aspheric part as described above and generate the double image phenomenon.

Referring now to FIGS. 12 and 13, a description will be given of the structure of the dome cover 10 according to this embodiment and the positional relationship between the dome cover 10 and the camera body 20. The dome cover 10 has the spherical part 10a and the aspherical part 10b. The spherical part 10a and the aspherical part 10b are adjacent to each other. $R1_{Da}$ is the radius of curvature of the front surface of the spherical part 10a, $R2_{Da}$ is the radius of curvature of the back surface of the spherical part 10a, and OD is the centers of the spheres on both the front and back surfaces of the spherical part 10a. $R2_{Da}$ is the radius of curvature of the front surface of the aspherical part 10b, and $R2_{Db}$ is the radius of curvature of the back surface of the aspherical part 10b. The aspheric part 10b has a toric surface shape obtained by rotating part of the arc around the rotary shaft O as a reference. The radii of curvature of the arcs of the front and back surfaces correspond to $R1_{Db}$ and $R2_{Db}$. The curvature radii $R1_{Db}$ and $R2_{Db}$ of the arcs may be infinite ∞ as illustrated in FIG. 12. In this case, the sectional shape draws a straight line.

The camera body 20 is rotatable in the pan direction and in the tilt direction around the rotation center OC inside the dome cover 10 by the driving mechanism 31, as illustrated in FIGS. 23A to 23C. When the camera body 20 captures an object within the range of the spherical part 10a of the dome cover 10 and the center of the sphere OD and the rotation center OC are located at the same position, the influence of the aspherical part 10b is stronger due to the tilt angle before the camera body 20 tilts to the horizontal direction. Thus, the rotation center OC is disposed at a position on the rotation axis O that is offset to a side closer to the spherical part 10a of the dome cover 10 from the center of the sphere OD by the distance LO. This configuration can reduce the influence of the aspherical part 10b. The dome cover 10 is made of a thermoplastic resin so that the entire shape of the dome cover 10 has no undercut in order to manufacture the dome cover 10 in a single molding step by injection molding and a mold.

In FIGS. 12 and 13, an angle $\theta_{r1}$ is an angle formed between the surface S1 orthogonal to the rotary shaft O and the straight line LS1 made by connecting the center of the sphere OD of the spherical part 10a with the boundary point P1 between the spherical part 10a and the aspherical shaped portion 10b on the front surface. An angle $\theta_{r2}$ is an angle formed between the plane S1 orthogonal to the rotary shaft O and the straight line LS2 made by connecting the center of the sphere OD of the spherical part 10a with the boundary point P2 between the spherical part 10a and the aspherical shaped portion 10b on the back surface. The angles $\theta_{r1}$ and $\theta_{r2}$ become plus (+) when they are formed below the plane S1 orthogonal to the rotation axis O or the boundary points P1 and P2 are located on the spherical part 10a side of the surface S1.

On the other hand, when the angles $\theta_{r1}$ and $\theta_{r2}$ are formed above the surface S1 or negative (−), the dome cover 10 has an undercut shape and thus it becomes difficult to release the molded dome cover 10 from the mold. Even when the angles $\theta_{r1}$ and $\theta_{r2}$ are 0°, it is difficult to release, from the mold, resin melted to shape the dome cover 10 due to the shrinkage during the solidification in the mold. Accordingly, each example sets a shape such that the angles $\theta_{r1}$ and $\theta_{r2}$ have positive values so as not to form the undercut shape.

Figure 17:
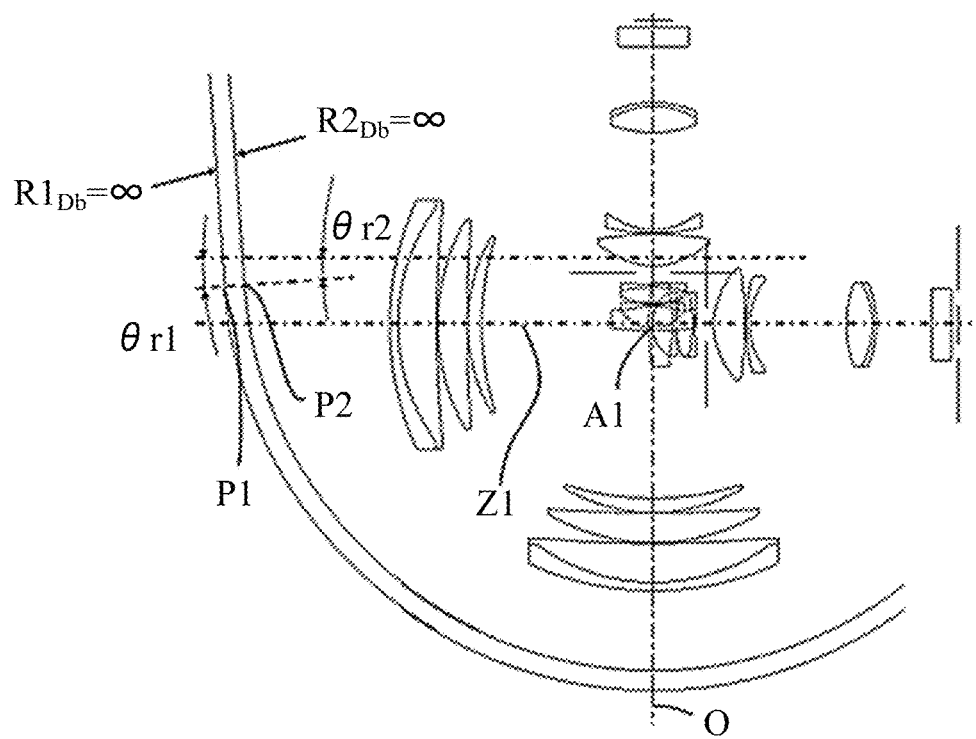
FIG. 17 is a sectional view of the image pickup apparatus according to Example 4.

FIG. 17 is a sectional view of the image pickup apparatus 1a according to Example 4, and illustrates the zoom lens at the telephoto end tilted in a horizontal direction and a vertically down direction. In FIG. 17, an intersection A1 between the center axis Z1 of the zoom lens and the rotation axis O of the aspherical part 10b is the center of rotation of the zoom lens. The image pickup apparatus 1a according to this example is configured so that LO, $\theta_{r1}$, and $\theta_{r2}$ are positive. The aspherical parts 10b on both the front surface and the back surface are shaped so as to move away from the rotation axis O of the aspherical part 10b as the position approaches to the periphery. Neither the spherical part 10a nor the aspherical part 10b adjacent to it has the undercut shape including the boundary points P1 and P2. At the boundary points P1 and P2 between the spherical part 10a and the aspherical part 10b, the tangent line of the spherical part 10a and the tangent line of the aspherical part 10b are configured to be the same straight line. The dome cover 10 has a rotationally symmetric shape around the rotation axis O of the aspherical part 10b. Hence, due to the above configuration, at any of the boundary points P1 and P2, both the tangential planes of the spherical part 10a and the aspherical part 10b become the same plane.

Both the angles $\theta_{r1}$ and $\theta_{r2}$ start with straight lines drawn horizontally from the center of the spherical part 10a. The angles $\theta_{r1}$ and $\theta_{r2}$ end at the boundary points P1 and P2 between the spherical part 10a and the aspherical part 10b on the front and back surfaces, respectively. The angles $\theta_{r1}$ and $\theta_{r2}$ are different angles from each other. In this example, the angle $\theta_{r2}$ is larger than the angle $\theta_{r1}$ by 0.2°. Thereby, the light fluxes incident on the front surface and the back surface can be bent by desired angles, and the double image can be advantageously suppressed.

Figure 16:
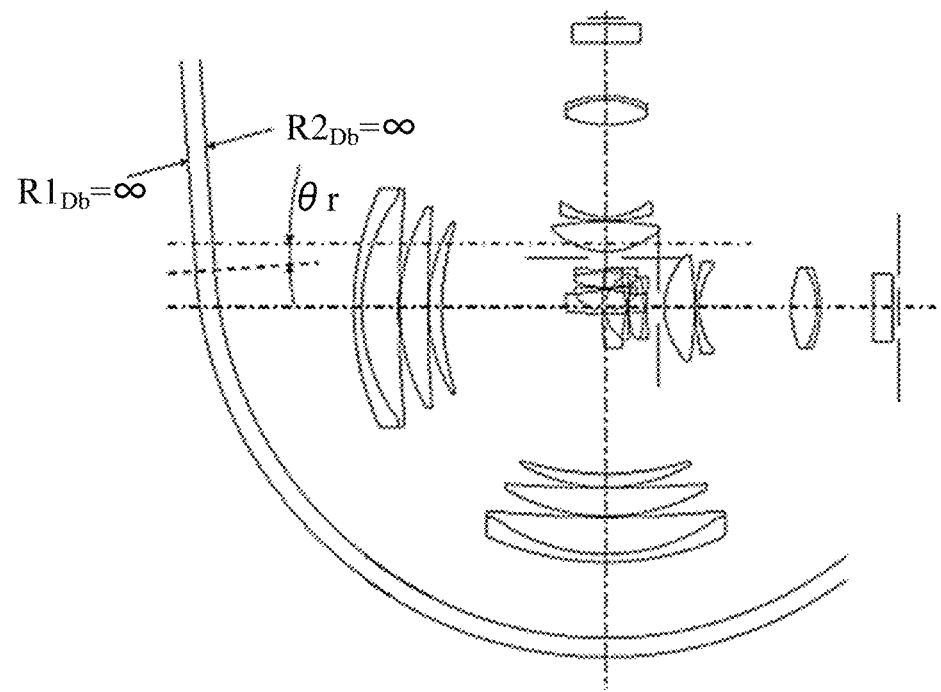
FIG. 16 is a sectional view of an image pickup apparatus according to comparative example 2.
Figure 18:
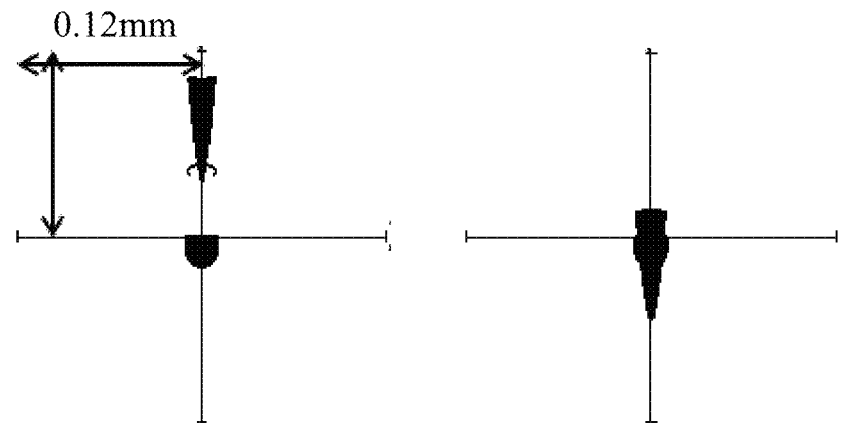
FIG. 18 illustrates spot diagrams according to comparative example 2 and Example 4.

FIG. 16 is a sectional view of the image pickup apparatus according to a comparative example (comparative example 2) to Example 4. In the image pickup apparatus according to comparative example 2, $\theta_{r1}=\theta_{r2}$ is established and both collectively are denoted as $\theta_r$. Other configurations in comparative example 2 are the same as those of Example 4. FIG. 18 illustrates axial spot diagrams on an image plane IP according to comparative example 2 and Example 4 at the zoom intermediate of comparative example 2 and Example 4 in a comparison manner.

FIG. 18 illustrates the zoom lens in the zoom intermediate state. In FIG. 18, the ordinate axis represents the axis in the paper direction in FIGS. 16 and 17, and the abscissa axis represents the axis orthogonal to the paper direction. The intersection between the ordinate and abscissa axes is a point on the center axis of the zoom lens. The spot diagram represents an imaging state of a point object on the image plane IP. The spot display range has a range of ±0.12 mm in the ordinate direction and the abscissa direction around the intersection between the ordinate and abscissa axes in FIG. 18. Comparative example 2 shows two spots including a spot formed at the center and a spot formed in a vertically elongated shape displaced upwardly from the center. The two spots means two image points generated for one object point or the double image phenomenon. On the other hand, Example 4 shows both a circular spot and a vertically elongated spot overlapping at the intersection of the ordinate and abscissa axes or the center of the analysis range. This means a state of no double image phenomenon.

Figure 20:
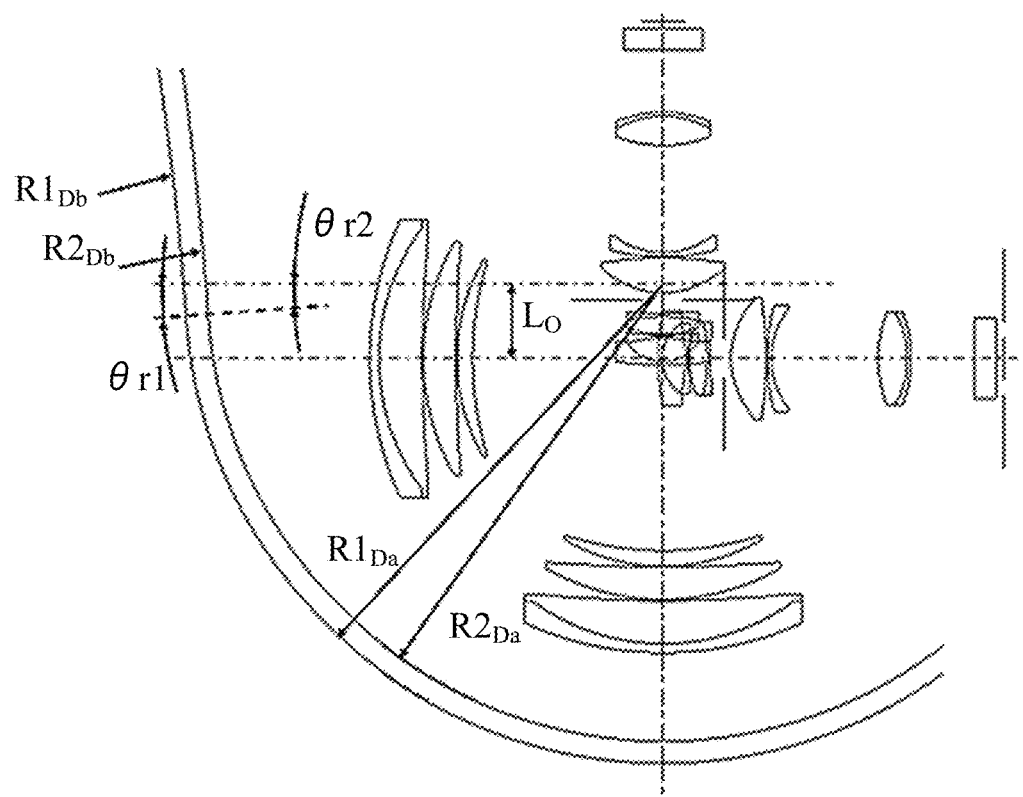
FIG. 20 is a sectional view of an image pickup apparatus according to Example 5.
Figure 22:
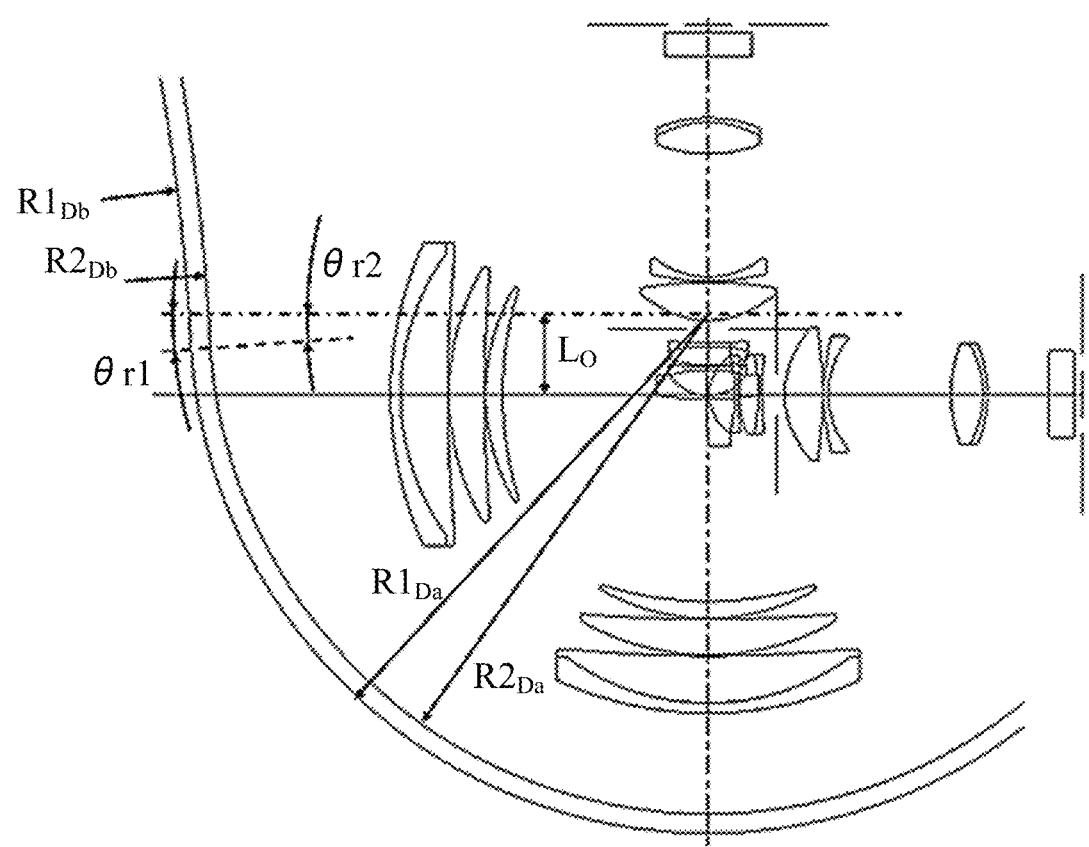
FIG. 22 is a sectional view of an image pickup apparatus according to Example 6.

FIG. 20 is a sectional view of the image pickup apparatus 1b according to Example 5. FIG. 22 is a sectional view of the image pickup apparatus 1b according to Example 6. In Example 4, the section of the aspherical part 10b draws the straight line or $R1_{Db}=R2_{Db}=\infty$. On the other hand, Examples 5 and 6 set R1$_{Db}$ and R2$_{Db}$ to values different from each other, controls the focal length on the section including the rotation axis O of the aspherical part 10b, and thereby makes the spot shape less likely to be vertically elongated. The angles θ$_{r1}$ and θ$_{r2}$ are different from each other. In Examples 5 and 6, the angle θ$_{r2}$ is larger than the angle θ$_{r1}$ by 0.1°. Thereby, the light fluxes incident on the front surface and the back surface can be bent by desired angles, and the double image can be advantageously suppressed.

Figure 19:
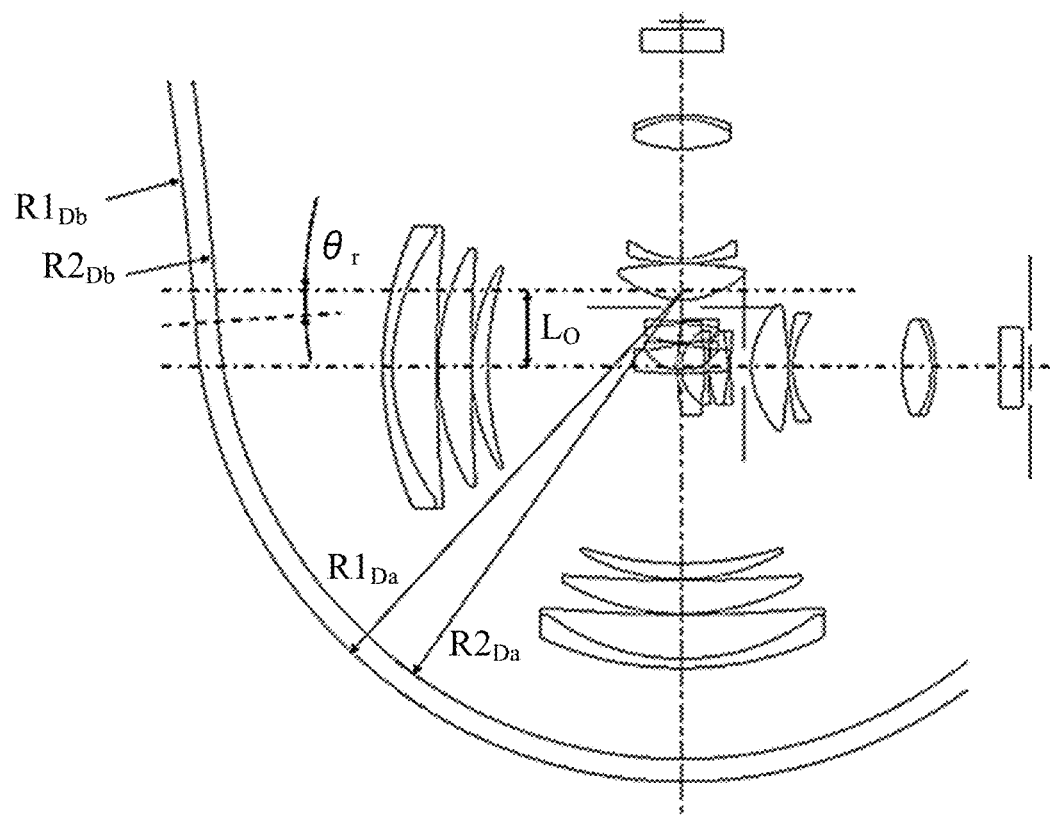
FIG. 19 is a sectional view of the image pickup apparatus according to comparative example 3.

FIG. 19 is a sectional view of an image pickup apparatus according to a comparative example (comparative example 3) to Example 5. In comparative example 3, θ$_{r1}$=θ$_{r2}$ is established and both are collectively denoted as θr. Other configurations are the same as those of Example 5.

Figure 21:
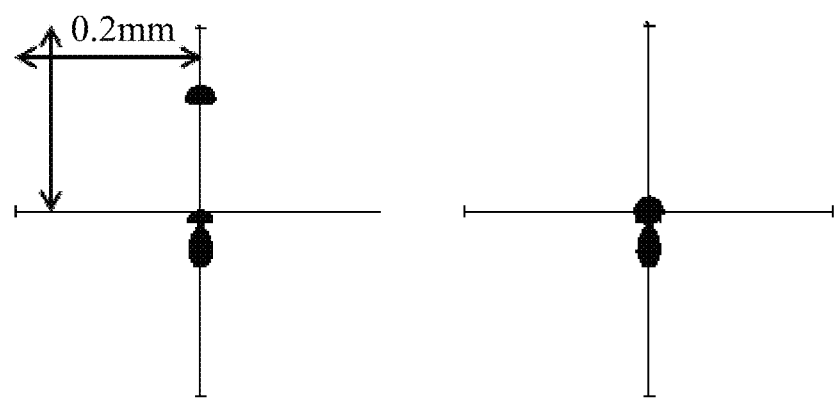
FIG. 21 illustrates spot diagrams according to comparative example 3 and Example 5.

FIG. 21 illustrates spot diagrams on the image plane IP according to comparative example 3 and Example 5, where the zoom lens is located at the telephoto end, and the spot display range has a range of ±0.20 mm in the vertical and horizontal directions with the center at the intersection of the ordinate and abscissa axes in the figure. Comparative example 3 shows two spots including a spot formed at the center and a spot shifted upwardly from the center. On the other hand, Example 5 shows two spots generated in comparative example 3 overlapping at the center of the analysis range.

The image pickup apparatus according to each example is not limited to a surveillance camera, but is applicable to other image pickup apparatuses such as a video camera and a digital camera. As described above, each example can provide a dome cover and an image pickup apparatus including the same, each of which can make the double image phenomenon less conspicuous with a small number of components and a simple configuration in a tilt region near the horizontal direction. In the zoom lens according to each example, the glass shape and the glass plate number are not limited to the above examples, and are properly variable. Each example may be configured to move part of lenses or lens unit in a directional component orthogonal to the optical axis and thereby to correct image blurs caused by vibrations such as camera shakes. Each example may be configured to correct the distortion and the chromatic aberration by an electric corrector. In each embodiment, the configuration and optical specification (angle of view and F-number) of the dome cover can be changed as appropriate.

An image pickup system (monitoring system) including the camera body according to each example and a controller that controls the camera body may be configured. Then, the controller can control the rotation of the camera body (pan/tilt driving), and the movement of each lens unit during zooming, focusing, image stabilizations, and the like of the zoom lens. The controller does not need to be integrated with the camera body and may be separated from it. For example, a controller (control device) disposed far from a driver that drives the camera body may include a transmission unit that sends a control signal (command) for controlling the camera body. Such a controller can remotely control the camera body.

The controller may include an operation unit such as a control device or a button for remotely controlling the camera body, and the camera body may be controlled in accordance with an input to the operation unit by the user. For example, the operation unit may include a scaling button, and the signal may be transmitted to the driver for the camera body so as to increase the magnification of the zoom lens when the user presses the scaling-up button, and to decrease the magnification of the zoom lens when the user presses the scaling-down button.

The image pickup system may include a display, such as a liquid crystal panel, that displays information (rotational state) on the panning and tilting of the camera body and zoom related information (moving state) of the zoom lens. The zoom related information of the zoom lens includes, for example, a zoom magnification (zoom state) and a moving amount (moving state) of each lens unit. In this case, the user can remotely control the camera body via the operation unit while viewing the information shown on the display. Then, the display and the operation unit may be integrated with each other, for example, through a touch panel.

Next follows numerical examples corresponding to the respective examples. A description will now be given of numerical examples without the dome cover 10 in the zoom lens 21 used in each example. In each numerical example, surface numbers are shown in order from the object side to the image side, r is a radius of curvature, d is a distance or interval, and nd and vd are a refractive index and an Abbe number, respectively, based on the d-line. "*" means an aspherical surface. In each numerical example, two surfaces closest to the image are flat surfaces corresponding to a glass block (optical block) G.

The aspherical shape is expressed with a displacement x in the optical axis direction at a position of height h from the optical axis based on the surface vertex as follows: $x=(h^2/r)/[1+\{1-(1+K)(h/r)^2\}^{1/2}]+A4 \cdot h^4+A6 \cdot h^6+A8 \cdot h^8+A10 \cdot h^{10}+A12 \cdot h^{12}$. Herein, r is a paraxial radius of curvature, K is a conic constant, and A4, A6, A8, A10, and A12 are fourth-order, sixth-order, eighth-order, tenth-order, and twelfth-order aspherical coefficients, respectively. For example, "e-Z" means "$10^{-Z}$". The angle of view is a numerical value of a half angle of view (ω) relating to an imageable angle of view in consideration of the distortion.

[Zoom Lens Numerical Values]

Unit: mm

| Surface data | | | | |
|---|---|---|---|---|
| Surface number | r | d | nd | vd |
| 1 | 45.340 | 1.25 | 2.00069 | 25.5 |
| 2 | 30.070 | 5.85 | 1.49700 | 81.5 |
| 3 | 176.956 | 0.15 | | |
| 4 | 31.963 | 4.42 | 1.59522 | 67.7 |
| 5 | 197.840 | 0.10 | | |
| 6 | 26.575 | 2.12 | 1.59522 | 67.7 |
| 7 | 43.716 | (variable) | | |
| 8 | 49.443 | 0.45 | 2.00100 | 29.1 |
| 9 | 5.843 | 3.17 | | |
| 10 | −18.179 | 0.40 | 1.91082 | 35.3 |
| 11 | 43.885 | 0.12 | | |
| 12 | 13.400 | 2.42 | 1.95906 | 17.5 |
| 13 | −21.705 | 0.40 | 1.91082 | 35.3 |
| 14 | 46.734 | (variable) | | |
| 15(stop) | ∞ | 1.00 | | |
| 16* | 10.759 | 4.79 | 1.69350 | 53.2 |
| 17* | −37.365 | 0.10 | | |
| 18 | 28.102 | 0.55 | 2.00100 | 29.1 |
| 19 | 10.770 | (variable) | | |
| 20* | 16.499 | 3.98 | 1.55332 | 71.7 |
| 21 | −12.410 | 0.50 | 1.94595 | 18.0 |
| 22 | −17.197 | (variable) | | |
| 23 | ∞ | 3.00 | 1.51633 | 64.1 |
| 24 | ∞ | 1.00 | | |
| Image plane | ∞ | | | |

Aspheric Data

| Sixteenth surface |
| --- |
| K = −1.03526e+000<br>A 5 = 8.04291e−007  A 7 = 5.49169e−008  A 9 = −7.95157e−010<br>A11 = 1.59096e−012 |

| Seventeenth surface |
| --- |
| K = −1.56411e+001<br>A 5 = 5.68090e−006  A 7 = −5.19224e−008 |

| Twentieth surface |
| --- |
| K = 4.09148e−002  A 4 = −6.34315e−005  A 6 = −1.71996e−007<br>A 8 = −2.89251e−010 |

Various Data

| Zoom ratio 29.49 | | | |
| --- | --- | --- | --- |
|  | Wide-angle | intermediate | telephoto |
| Focal length | 4.49 | 43.47 | 132.37 |
| F-number | 1.44 | 2.74 | 4.60 |
| View angle | 33.76 | 3.95 | 1.30 |
| Image height | 3.00 | 3.00 | 3.00 |
| Overall lens length | 84.70 | 84.70 | 84.70 |
| BF | 14.18 | 21.62 | 6.84 |
| d7 | 0.60 | 20.77 | 25.20 |
| d14 | 26.40 | 6.23 | 1.80 |
| d19 | 11.75 | 4.31 | 19.09 |
| d22 | 11.20 | 18.64 | 3.86 |

| Zoom lens unit data | | |
| --- | --- | --- |
| unit | starting surface | focal length |
| 1 | 1 | 37.44 |
| 2 | 8 | −5.71 |
| 3 | 15 | 27.79 |
| 4 | 20 | 18.24 |

Next follows numerical examples of the dome covers according to Examples 4 to 6 and comparative examples 2 and 3. LO is a distance in the rotation axis direction of the aspherical part 10b between the center of the sphere of the spherical part 10a in the dome cover 10 and the rotation center of the camera body 20. $R1_{Da}$ is a radius of curvature of the spherical part 10a on the surface of the dome cover 10. $R2_{Da}$ is a radius of curvature of the spherical part 10b on the back surface of the dome cover 10. $R1_{Db}$ is a radius of curvature on a section including the rotation axis of the aspherical part 10b on the surface of the dome cover 10. $R2_{Db}$ is a radius of curvature on a section including the rotation axis of the aspherical part 10b on the back surface of the dome cover 10. $R1_{Db}=\infty$ and $R2_{Db}=\infty$ mean that a straight line is drawn on the section including the rotation axis of the aspherical part 10b on the back surface of the dome cover 10. $\theta_{r1}$ and $\theta_{r2}$ are angles between a straight line orthogonal to the rotation axis and a straight line made by connecting the center of the sphere OD with a boundary point between the spherical part and the aspherical part on an arbitrary section including the rotation axis. t is the distance between the front surface and the back surface of the dome cover 10 on the rotation axis of the aspherical part 10b.

Numerical Example 4

LO=10.0 mm
$R1_{Da}$=65.0 mm
$R2_{Da}$=62.0 mm
$R1_{Db}$=∞
$R1_{Db}$=∞
$\theta_{r1}$=4.0°
$\theta_{r2}$=4.2°
t=3.0 mm Numerical Example 5

LO=10.0 mm
$R1_{Da}$=65.0 mm
$R2_{Da}$=62.0 mm
$R1_{Db}$=403.0 mm
$R2_{Db}$=500.0 mm
$\theta_{r1}$=3.9°
$\theta_{r2}$=4.0°
t=3.0 mm Numerical Example 6

LO=10.0 mm
$R1_{Da}$=64.9 mm
$R2_{Da}$=62.5 mm
$R1_{Db}$=275.0 mm
$R2_{Db}$=300.0 mm
$\theta_{r1}$=3.0°
$\theta_{r2}$=3.2°
t=2.4 mm Comparative Example 2

LO=10.0 mm
$R1_{Da}$=65.0 mm
$R2_{Da}$=62.0 mm
$R1_{Db}$=∞
$R2_{Db}$=∞
θr=4.0°
t=3.0 mm

Comparative Example 3

LO=10.0 mm
$R1_{Da}$=65.0 mm
$R2_{Da}$=62.0 mm
$R1_{Db}$=403.0 mm
$R2_{Db}$=500.0 mm
θr=4.0°
t=3.0 mm

Next follows numerical values of the conditional expression (2) according to each example.

$$\theta_{r2}-\theta_{r1} \quad \text{Conditional expression (2):}$$

Example 4 0.2
Example 5 0.1
Example 6 0.2

$$|fm/fd| \quad \text{Conditional expression (3):}$$

Example 4 0.0
Example 5 0.988
Example 6 1.279

The dome covers according to Examples 4 to 6 are integrally formed, and make the double image phenomenon less conspicuous due to the extended shape from the hemispherical region. Hence, the double image phenomenon can be made inconspicuous in a tilt region near the horizontal direction with a small number of components and a simple configuration. As a result, Examples 4 to 6 can provide a dome cover, an image pickup apparatus, and an image pickup system, each of which can suppress a decrease in image quality with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-029527, filed on Feb. 21, 2019, and Japanese Patent Application No. 2019-029528, filed on Feb. 21, 2019, each of which is hereby incorporated by reference herein in their entirety.

What is claimed is:

1. A dome cover for covering a camera, the dome cover comprising:
   a spherical part and an aspherical part,
   wherein the spherical part and the aspherical part have a boundary, where the spherical part and the aspherical part are adjacent to each other, on each of a front surface and a back surface of the dome cover,
   wherein the aspherical part has a shape symmetrical with respect to a rotation around a rotation axis including a center of a sphere of the spherical part,
   wherein on a section including the rotation axis, a distance from the rotation axis to the aspherical part increases as a position of the aspherical part becomes more distant from the boundary, an angle formed between the rotation axis and a line segment connecting the center of the sphere and the boundary on the front surface is less than 90°, and
   wherein a conditional expression $$1.12 < |fm/fd| < 1.80$$

is satisfied where fd is a focal length of the spherical part, and fm is a focal length of the aspherical part.

2. The dome cover according to claim 1, wherein on the section, each of the front surface and the back surface of the aspherical part has an arc shape.

3. The dome cover according to claim 1, wherein at the boundary, a tangential plane is common to the spherical part and the aspherical part.

4. The dome cover according to claim 1, wherein a center of a sphere of the front surface and a center of a sphere of the back surface of the spherical part are disposed on the rotation axis.

5. The dome cover according to claim 1, wherein the rotation axis is common to the front surface and the back surface of the aspherical part.

6. The dome cover according to claim 1, wherein a material of the dome cover includes a thermoplastic resin.

7. A dome cover for covering a camera, the dome cover comprising:
   a spherical part and an aspherical part,
   wherein the spherical part and the aspherical part have a boundary, where the spherical part and the aspherical part are adjacent to each other, on each of a front surface and a back surface of the dome cover,
   wherein the aspherical part has a shape symmetrical with respect to a rotation around a rotation axis including a center of a sphere of the spherical part,
   wherein on a section including the rotation axis, a distance from the rotation axis to the aspherical part increases as a position of the aspherical part becomes more distant from the boundary, an angle formed between the rotation axis and a line segment connecting the center of the sphere and the boundary on the front surface is less than 90°, and
   wherein a conditional expression $$0.00 < \theta_{r2} - \theta_{r1} < 1.00$$

is satisfied where $\theta_{r1}$ (°) is an angle formed between the line segment and a plane orthogonal to the rotation axis, and $\theta_{r2}$ (°) is an angle formed between the plane and a line segment connecting the center of the sphere and the boundary on the back surface.

8. The dome cover according to claim 7, wherein at the boundary, a tangential plane is common to the spherical part and the aspherical part.

9. The dome cover according to claim 7, wherein a center of a sphere of the front surface and a center of a sphere of the back surface of the spherical part are disposed on the rotation axis.

10. The dome cover according to claim 7, wherein the rotation axis is common to the front surface and the back surface of the aspherical part.

11. The dome cover according to claim 7, wherein a material of the dome cover includes a thermoplastic resin.

12. The dome cover according to claim 7, wherein on the section, each of the front surface and the back surface of the aspherical part has an arc shape, and
    wherein a conditional expression $$0.40 < |fm/fd| < 1.80$$

is satisfied where fd is a focal length of the spherical part, and fm is a focal length of the aspherical part.

13. An image pickup apparatus comprising:
    the dome cover according to claim 1; and
    a camera covered with the dome cover.

14. The image pickup apparatus according to claim 13, further comprising a driving device configured to rotate the camera,
    wherein a rotation center of the camera is located on the rotation axis.

15. An image pickup system comprising:
    the image pickup apparatus according to claim 13; and
    a controller configured to perform a control of the image pickup apparatus.

16. The image pickup system according to claim 15, wherein the controller includes a transmitter configured to transmit a control signal for controlling the image pickup apparatus.

17. The image pickup system according to claim 15, wherein the controller includes an operation unit configured to operate the image pickup apparatus.

18. The image pickup system according to claim 15, further comprising a display configured to display information on the control.

19. An image pickup apparatus comprising:
    the dome cover according to claim 7; and
    a camera covered with the dome cover.

20. An image pickup system comprising:
    the image pickup apparatus according to claim 19; and
    a controller configured to perform a control of the image pickup apparatus.

* * * * *